(12) United States Patent
Kim

(10) Patent No.: US 8,599,351 B2
(45) Date of Patent: Dec. 3, 2013

(54) LIQUID CRYSTAL DISPLAY

(75) Inventor: Dong Gyu Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 1431 days.

(21) Appl. No.: 11/555,723

(22) Filed: Nov. 2, 2006

(65) Prior Publication Data
US 2007/0109482 A1    May 17, 2007

(30) Foreign Application Priority Data
Nov. 14, 2005   (KR) .......................... 10 2005 0108402

(51) Int. Cl.
*G02F 1/1343*   (2006.01)

(52) U.S. Cl.
USPC .............. 349/146; 349/37; 349/143; 349/144

(58) Field of Classification Search
USPC .................................. 349/37, 143, 144, 146
See application file for complete search history.

(56) References Cited

U.S. PATENT DOCUMENTS

| | | | |
|---|---|---|---|
| 5,923,391 A * | 7/1999 | Watanabe et al. | 349/110 |
| 6,259,493 B1 * | 7/2001 | Nakamura et al. | 349/38 |
| 6,611,311 B1 * | 8/2003 | Kretz et al. | 349/143 |
| 6,741,314 B2 * | 5/2004 | Song | 349/144 |
| 6,781,658 B1 * | 8/2004 | Choi | 349/139 |
| 7,554,616 B1 * | 6/2009 | Takemura | 349/38 |
| 2003/0107694 A1 * | 6/2003 | Song | 349/129 |
| 2004/0070713 A1 * | 4/2004 | Song | 349/129 |
| 2004/0263750 A1 * | 12/2004 | Chae | 349/141 |
| 2005/0078253 A1 * | 4/2005 | Kim et al. | 349/139 |
| 2005/0168678 A1 * | 8/2005 | Andou et al. | 349/145 |
| 2005/0213015 A1 * | 9/2005 | Shimoshikiryo | 349/144 |

FOREIGN PATENT DOCUMENTS

| | | |
|---|---|---|
| CN | 1612024 A | 5/2005 |
| CN | 1617033 A | 5/2005 |
| JP | 2003228073 A | 8/2003 |
| JP | 2005-316211 A | 11/2005 |
| KR | 1019990006951 A | 1/1999 |
| KR | 1020000005852 A | 1/2000 |
| KR | 1020030044872 A | 6/2003 |
| KR | 1020030047366 A | 6/2003 |
| KR | 1020030095260 A | 12/2003 |
| TW | 548452 | 8/2003 |
| TW | 200302383 | 8/2003 |
| TW | 200531285 | 9/2005 |

* cited by examiner

*Primary Examiner* — Jessica M Merlin
(74) *Attorney, Agent, or Firm* — Cantor Colburn LLP

(57) ABSTRACT

A liquid crystal display includes a substrate; a plurality of pixel electrodes formed on the substrate, each of the pixel electrodes including a first and a second sub-pixel electrode; and a plurality of first data lines formed on the substrate, wherein the first data line overlaps the first and second sub-pixel electrodes of each of two adjacent pixel electrodes among the pixel electrodes.

17 Claims, 15 Drawing Sheets

LIQUID CRYSTAL DISPLAY

This application claims priority to Korean Patent Application No. 10-2005-0108402, filed on Nov. 14, 2005 and all the benefits accruing therefrom under 35 U.S.C. §119, and the contents of which in its entirety are herein incorporated by reference.

BACKGROUND OF THE INVENTION (a) Field of the Invention

The present invention relates to a liquid crystal display ("LCD") and method thereof. More particularly, the present invention relates to an LCD minimizing occurrence of vertical cross-talk and a method of minimizing vertical cross-talk in the LCD.

(b) Description of the Related Art

Liquid crystal displays ("LCDs") are one of the most widely used flat panel displays. An LCD includes a pair of panels including field-generating electrodes such as pixel electrodes and a common electrode, and a liquid crystal ("LC") layer interposed between the panels. The LCD generates an electric field in the LC layer by applying voltages to the electrodes, and obtains desired images by controlling the strength of the electric field for determining orientations of LC molecules within the LC layer and polarization of light incident on the LC layer to vary the transmittance of light incident on the LC layer.

An LCD also includes switching elements connected to the respective pixel electrodes, and a plurality of signal lines such as gate lines and data lines for controlling the switching elements and thereby applying voltages to the pixel electrodes.

A vertically aligned ("VA") mode LCD, which aligns the major axes of the LC molecules perpendicular to the upper and lower panels in the absence of an electric field, has a high contrast ratio and wide reference viewing angle. The reference viewing angle is defined as a viewing angle making the contrast ratio equal to 1:10 or as a limit angle for the inversion in luminance between the grays.

To implement a wide viewing angle in the VA mode LCD, cutouts are provided in the field generating electrodes or protrusions are provided on the field generating electrodes. Since the cutouts and the protrusions can determine the tilt directions of the LC molecules, the tilt directions can be distributed into several directions by using cutouts and protrusions, thereby imparting a wide reference viewing angle.

In the case of a patterned vertically aligned ("PVA") mode LCD, in order to improve the lateral visibility, it has been suggested to divide each of the pixel electrodes into two sub-pixel electrodes that are capacitively coupled to each other. Then, one sub-pixel is applied with a voltage directly and the other sub-pixel is supplied with a lower voltage due to the capacitive coupling so that the two sub-pixel electrodes have different voltages from each other, which causes different transmittances of the two sub-pixels.

Voltages are applied to the field-generating electrodes in the LCD to generate an electric field in the LC layer and the strength of the electric field is regulated to adjust transmittance of light passing through the LC layer, thereby displaying desired images. To prevent the LC layer from deterioration due to a one-directional electric field applied for a long time, the polarity of a data voltage is reversed for each frame, for each row, or for each pixel with respect to a common voltage.

BRIEF SUMMARY OF THE INVENTION

The present invention provides a liquid crystal display ("LCD") having advantages such that an occurrence of vertical cross-talk is prevented.

The present invention also provides a method of minimizing vertical cross-talk in an LCD.

Exemplary embodiments of the present invention provide an LCD including a substrate, a plurality of pixel electrodes formed on the substrate, each of the pixel electrodes including a first and a second sub-pixel electrode, and a plurality of first data lines formed on the substrate in a column direction of the LCD, wherein at least one of the first data lines overlaps the first and the second sub-pixel electrodes of the pixel electrode connected thereto, and further overlaps at least a second sub-pixel electrode of an adjacent pixel electrode in a row direction of the LCD.

Here, the pixel electrodes may include a first pixel electrode connected to one of the first data lines, and a second pixel electrode adjacent to the first pixel electrode, and the one of the first data lines may include a first portion overlapping the first sub-pixel electrode of the first pixel electrode, a second portion overlapping the second sub-pixel electrode of the first pixel electrode, a third portion overlapping the first sub-pixel electrode of the second pixel electrode, and a fourth portion overlapping the second sub-pixel electrode of the second pixel electrode.

The first portion and the second portion may make a predetermined angle of the first data line is curved at the fourth portion. The first portion and the fourth portion may be disposed in a straight line. The third portion and the fourth portion may make a predetermined angle. The first portion and the third portion may be parallel to each other. The first, the second, and the fourth portions may be divided into two parts, respectively.

A width of the third portion may be wider than a width of the first portion. A length of the first portion may be longer than a length of the third portion.

An area of the first portion may be substantially equal to an area of the third portion.

An area of the second portion may be substantially equal to an area of the fourth portion.

The LCD may further include an organic layer formed between the first data lines and the plurality of pixel electrodes.

The first sub-pixel electrode and the second sub-pixel electrode of each pixel electrode may be horizontally adjacent to each other, and each of the first and the second sub-pixel electrodes may include at least two parallelogrammic electrode pieces having different inclination directions from each other, and at least one of the electrode pieces of each second sub-pixel electrode may be disposed above or below each first sub-pixel electrode, respectively.

Each first sub-pixel electrode may include a right-inclined parallelogrammic electrode piece and a left-inclined parallelogrammic electrode piece, and each second sub-pixel electrode may include three right-inclined parallelogrammic electrode pieces and three left-inclined parallelogrammic electrode pieces.

The right-inclined parallelogrammic electrode piece and the left-inclined parallelogrammic electrode piece may be alternately arranged in a vertical direction.

A height of the electrode pieces of each first sub-pixel electrode may be greater than a height of the electrode piece disposed above or below each first sub-pixel electrode among the electrode pieces of each second sub-pixel electrode.

Each of the plurality of pixel electrodes may include at least two first electrodes and at least one second electrode that are vertically adjacent to each other, and each of the first and the second electrodes may include at least two parallelogrammic electrode pieces having different inclination directions from each other. The first sub-pixel electrode of each pixel electrode may include one of the at least two first electrodes, and the second sub-pixel electrode of each pixel electrode may include at least one of the at least two first electrodes and the at least one second electrode.

A height of the at least two first electrodes may be different from a height of the at least one second electrode. Each first electrode of each first sub-pixel electrode may be horizontally adjacent to each first electrode of each second sub-pixel electrode.

Each of the electrode pieces may include a pair of oblique edges parallel to each other, and the oblique edges of the electrode piece of the at least two first electrodes may be disposed in a staggered manner with the oblique edges of the electrode piece of the at least one second electrode.

The at least one of the plurality of pixel electrodes may include at least one first electrode and at least one second electrode, each of the first and the second electrodes may include at least two parallelogrammic electrode pieces having different inclination directions from each other, and a height of the at least one first electrode may be different from a height of the at least one second electrode.

The first sub-pixel electrode of the at least one of the plurality of pixel electrodes may include the first electrode, and the second sub-pixel electrode of the at least one of the plurality of pixel electrodes includes two or more of the second electrodes.

The second sub-pixel electrode of the at least one of the plurality of pixel electrodes may include three of the second electrodes that are horizontally adjacent and connected to each other, and the first sub-pixel electrode of the at least one of the plurality of pixel electrodes may be aligned with a second electrode disposed in a middle among the second electrodes.

An area of the second sub-pixel electrode of at least one of the plurality of pixel electrodes may be larger than an area of the first sub-pixel electrode of the at least one of the plurality of pixel electrodes.

A voltage of the first sub-pixel electrode of at least one of the plurality of pixel electrodes may be different from a voltage of the second sub-pixel electrode of the at least one of the plurality of pixel electrodes.

The LCD may further include a first thin film transistor ("TFT") connected to one of the first sub-pixel electrodes, a second TFT connected to one of the second sub-pixel electrodes, a first gate line connected to the first TFT, and a second gate line connected to the second TFT.

The first and the second TFTs may be turned on in response to signals from the first and the second gate lines and transmit signals from at least one of the first data lines, respectively.

The LCD may further include a first TFT connected to one of the first sub-pixel electrodes, a second TFT connected to one of the second sub-pixel electrodes, a second data line formed on the substrate, the second data line forming a pair with one of the first data lines, and a gate line intersecting the first and the second data lines, wherein the first TFT is connected to one of the first data lines and the gate line, and the second TFT is connected to the second data line and the gate line.

The first and the second TFTs may be turned on in response to signals from the gate line and transmit signals from the first and the second data lines, respectively.

The LCD may further include an organic layer formed between the second data line and the pixel electrodes.

Other exemplary embodiments of the present invention provide an LCD including a substrate, a plurality of pixel electrodes formed on the substrate, each of the pixel electrodes including a first and a second sub-pixel electrode, and a plurality of first data lines overlapping the pixel electrodes, wherein at least one of the first sub-pixel electrode overlaps both of two adjacent first data lines among the first data lines.

Here, distances between adjacent first data lines among the plurality of first data lines may be different from each other.

The first data lines may include a self data line connected to the first sub-pixel electrodes and an adjacent data line adjacent to the self data line, and at least one of the first sub-pixel electrodes may include a first portion overlapping the self data line and a second portion overlapping the adjacent data line.

A width of the second portion may be wider than a width of the first portion. A length of the second portion may be shorter than a length of the first portion. An area of the second portion may be substantially equal to an area of the first portion. The LCD may further include a plurality of second data lines formed on the substrate, each of the second data lines forming a pair of data lines with the first data lines adjacent to the second data lines, respectively. Each pair of data lines may include a self pair of data lines connected to the first sub-pixel electrodes and an adjacent pair of data lines adjacent to the self pair of data lines, and at least one of the first sub-pixel electrodes may include a first portion overlapping the self pair of data lines and a second portion overlapping the adjacent pair of data lines.

A width of the second portion may be wider than a width of the first portion. A length of the second portion may be shorter than a length of the first portion. An area of the second portion may be substantially equal to an area of the first portion.

Still further exemplary embodiments of the present invention provide a method of minimizing vertical cross-talk in a display device, the method including forming a first data line and an adjacent second data line on a substrate in a column direction of the display device, overlapping the first data line with first and second sub-pixel electrodes of a first pixel electrode, the first pixel electrode electrically connected to the first data line via a switching element, overlapping the first data line with at least one of a first and second sub-pixel electrode of a second pixel electrode, the second pixel electrode adjacent to the first pixel electrode in a row direction of the display device, the second pixel electrode also overlapping the second data line and electrically connected to the second data line via a switching element, and applying data voltages of opposite polarities to the first and second data lines, wherein changes of a pixel electrode voltage due to parasitic capacitances between the data lines and the pixel electrodes occur substantially simultaneously in positive-polarity and negative-polarity directions, and counteract each other.

BRIEF DESCRIPTION OF THE DRAWINGS

The present invention will become more apparent by further describing exemplary embodiments thereof with reference to the accompanying drawings, in which.

DETAILED DESCRIPTION OF THE INVENTION

Figure 1:
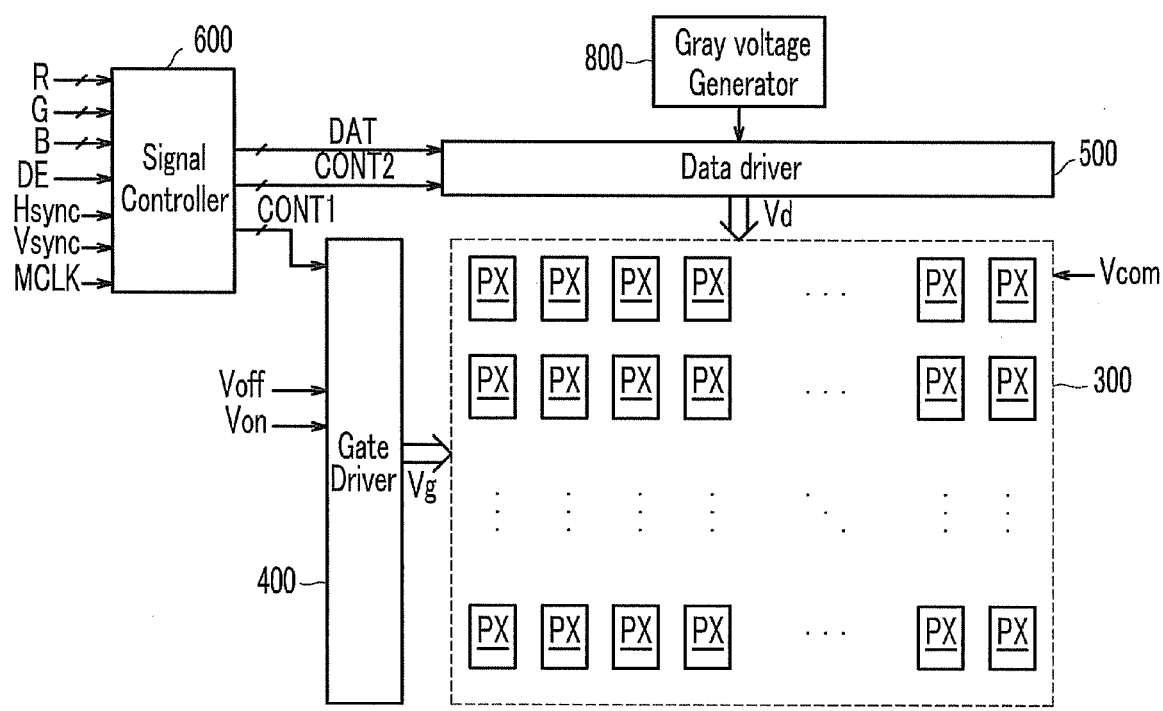
FIG. 1 is a block diagram of an exemplary liquid crystal display ("LCD") according to an exemplary embodiment of the present invention.

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. A parasitic capacitance is generated between a data line and a pixel electrode of a liquid crystal display ("LCD"). The parasitic capacitance affects the pixel electrode voltage, particularly changing the voltage of a sub-pixel electrode applied with a high voltage among sub-pixels when a low gray voltage is applied, thereby changing the luminance. Consequently, vertical cross-talk is generated, which deteriorates the image quality of an LCD as a result.

Accordingly, the present invention prevents occurrence of vertical cross-talk in an LCD to thus improve the image quality of the LCD. Hereinafter, the present invention will be described in detail with reference to the accompanying drawings.

First, an LCD according to an exemplary embodiment of the present invention will be described with reference to FIG. 1 and FIG. 2.

Figure 2:
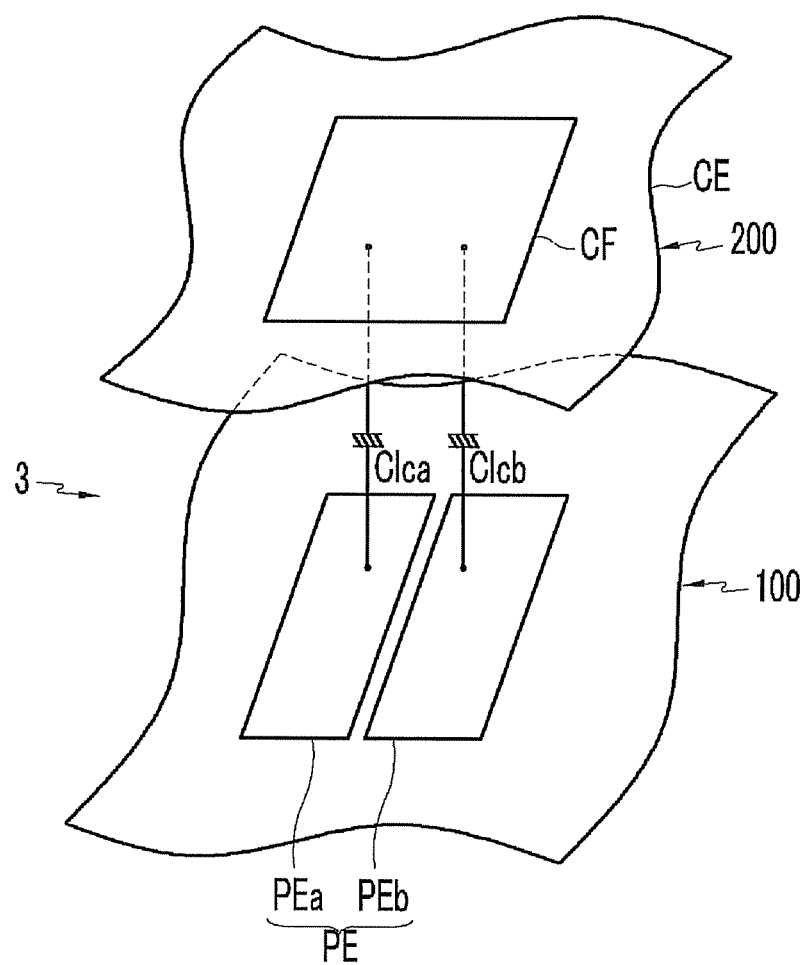
FIG. 2 is an equivalent circuit diagram of two exemplary sub-pixels of an exemplary LCD according to an exemplary embodiment of the present invention.

FIG. 1 is a block diagram of an exemplary LCD according to an exemplary embodiment of the present invention, and FIG. 2 is an equivalent circuit diagram of two exemplary sub-pixels of an exemplary LCD according to an exemplary embodiment of the present invention.

As shown in FIG. 1, an LCD includes a liquid crystal ("LC") panel assembly 300, a gate driver 400 and a data driver 500 that are connected to the LC panel assembly 300, a gray voltage generator 800 connected to the data driver 500, and a signal controller 600 controlling the above elements.

The LC panel assembly 300 includes a plurality of signal lines (not shown), and a plurality of pixels PX connected to the signal lines and arranged substantially in a matrix, as seen in the equivalent circuit diagram. The LC panel assembly 300 includes lower and upper panels 100 and 200 that face each other with an LC layer 3 interposed there between, in a structural view shown in FIG. 2.

The signal lines include a plurality of gate lines (not shown) for transmitting gate signals (also referred to as "scanning signals") and a plurality of data lines (not shown) for transmitting data signals. The gate lines extend substantially in a row direction, a first direction, and substantially parallel to each other, and the data lines extend substantially in a column direction, a second direction, and substantially parallel to each other. The first and second directions may be substantially perpendicular to each other.

Each pixel PX includes a pair of sub-pixels, and each sub-pixel includes an LC capacitor Clca or Clcb. At least one of the two sub-pixels includes a switching element (not shown) connected to a gate line, a data line, and an LC capacitor Clca or Clcb.

The LC capacitor Clca/Clcb includes a sub-pixel electrode PEa/PEb provided on the lower panel 100 and a common electrode CE provided on the upper panel 200 as two terminals, and the LC layer 3 disposed between the sub-pixel electrode PEa/PEb and the common electrode CE functions as a dielectric of the LC capacitor Clca/Clcb. One pair of sub-pixel electrodes PEa and PEb that are separated from each other form a pixel electrode PE. The common electrode CE is supplied with a common voltage Vcom and covers an entire surface, or substantially an entire surface, of the upper panel 200. The LC layer 3 has negative dielectric anisotropy, and the LC molecules in the LC layer 3 may be oriented so that long axes of the LC molecules are substantially perpendicular to the two panels 100, 200 in absence of an electric field.

In the meantime, in order to implement color display, each pixel PX uniquely displays one color in a set of colors, such as primary colors, (spatial division) or each pixel PX sequentially displays the colors in turn (temporal division) such that the spatial or temporal sum of the colors is recognized as a desired color. An example of a set of the colors, such as primary colors, includes red, green, and blue. FIG. 2 shows an example of the spatial division in which each pixel PX includes a color filter CF representing one of the colors in an area of the upper panel 200. Alternatively, the color filter CF may be provided on or under the sub-pixel electrode PEa/PEb provided on the lower panel 100.

Polarizers (not shown) are provided on the outer surface of the panels 100 and 200, and the polarization axes of two polarizers may be perpendicular to each other. One of the two polarizers may be omitted when the LCD is a reflective LCD. In the case of perpendicular polarizers, incident light into the LC layer 3 in the absence of an electric field cannot pass through the polarizer.

A structure of a pixel electrode of the LC panel assembly will now be further described with reference to FIG. 3, FIG. 4A, FIG. 4B, and FIG. 4C.

Figure 3:
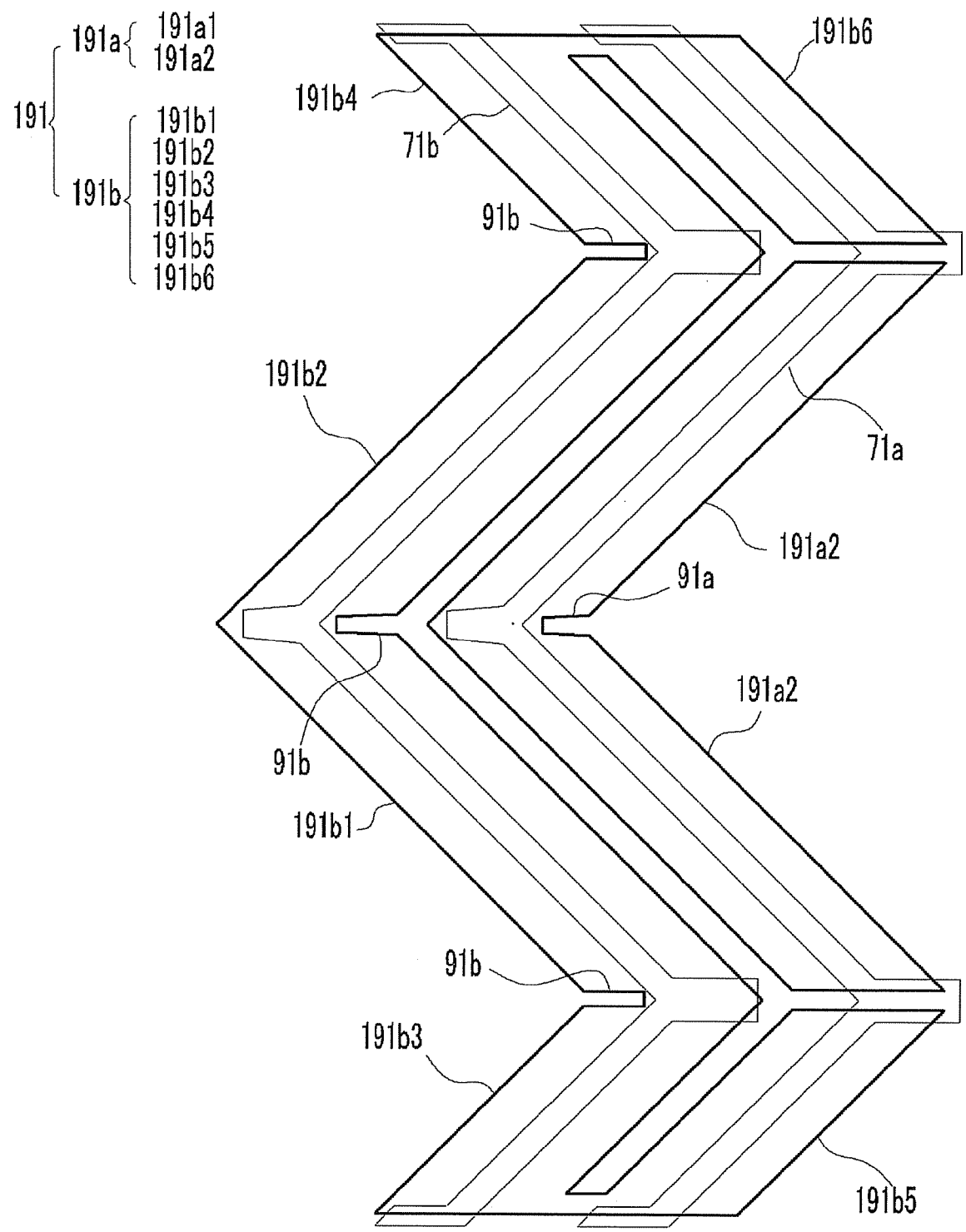
FIG. 3 is a layout view of an exemplary pixel electrode and an exemplary common electrode of an exemplary liquid crystal ("LC") panel assembly according to various exemplary embodiments of the present invention.
Figure 4A:
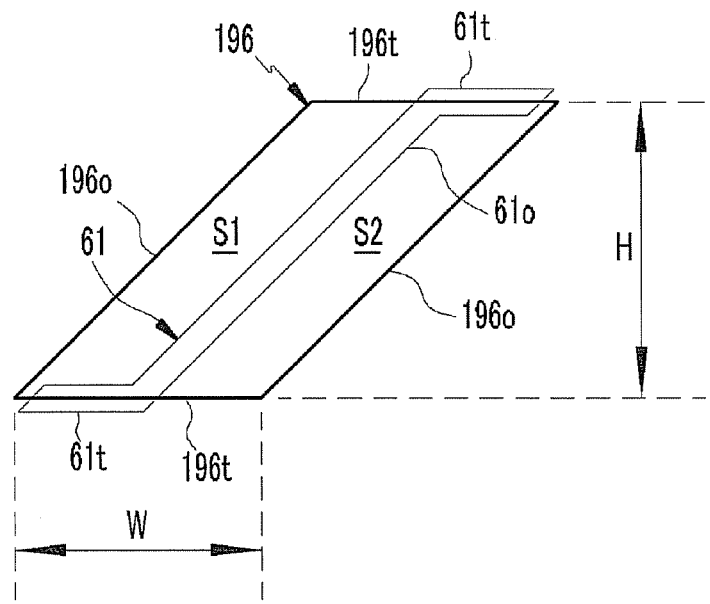
FIG. 4A to FIG. 4C are plan views of exemplary electrode pieces that form an exemplary base unit of each exemplary sub-pixel electrode illustrated in FIG. 3.
Figure 4B:
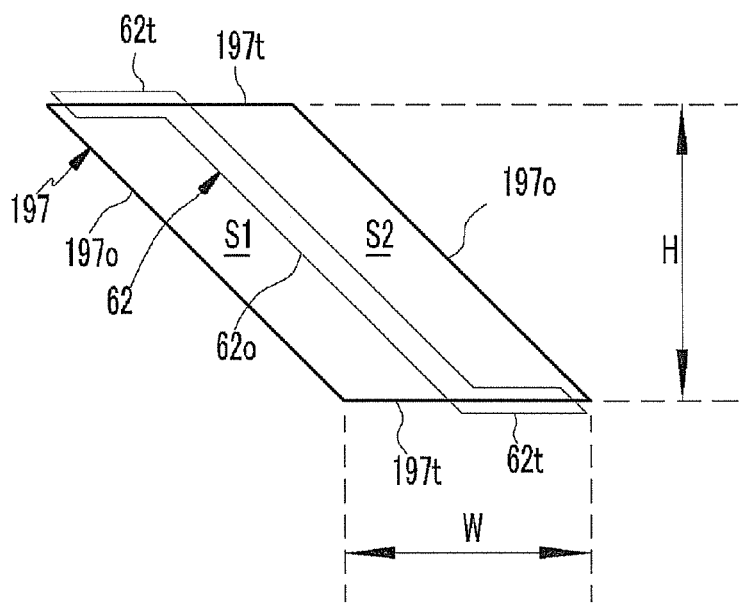
Figure 4C:
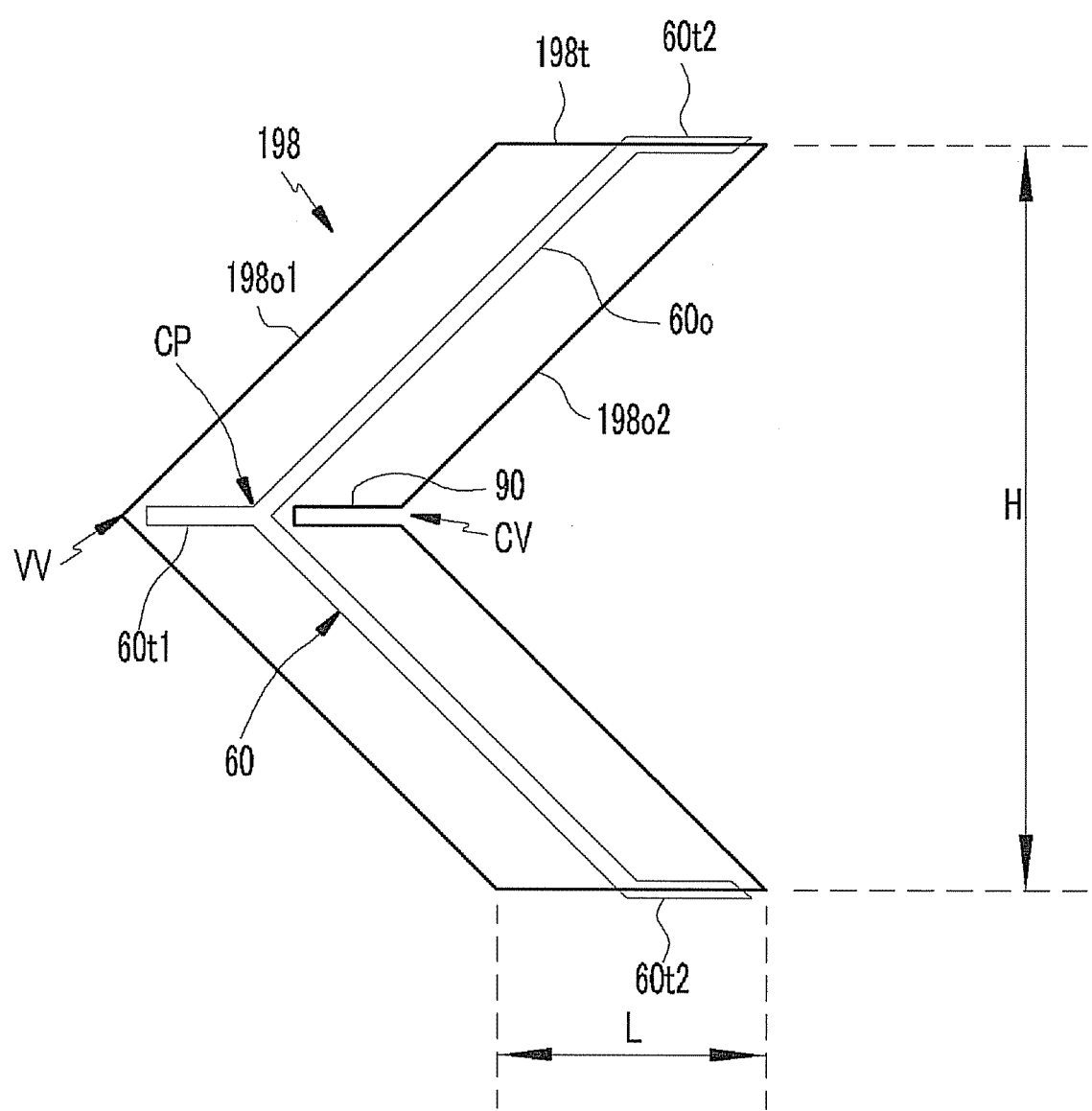

FIG. 3 is a layout view of an exemplary pixel electrode and an exemplary common electrode of an exemplary LC panel assembly according to various exemplary embodiments of the present invention, and FIG. 4A to FIG. 4C are plan views of exemplary electrode pieces which form a base unit of each exemplary sub-pixel electrode illustrated in FIG. 3.

As shown in FIG. 3, each pixel electrode 191 of an LC panel assembly includes a pair of a first and a second sub-pixel electrode 191a and 191b that are separated from each other. The first sub-pixel electrode 191a and the second sub-pixel electrode 191b are adjacent to each other in the row direction of the LC panel assembly and have cutouts 91a and 91b. The common electrode (270, refer to FIG. 2) includes cutouts 71a and 71b opposing the first and second sub-pixel electrodes 191a and 191b.

Both of the first and the second subpixel electrodes 191a and 191b forming a pixel electrode 191 may be coupled to respective switching elements (not shown). Alternatively, the second sub-pixel electrode 191b may be capacitively coupled to the first sub-pixel electrode 191a while the first sub-pixel electrode 191a is connected to a switching element (not shown).

Each of the first and second sub-pixel electrodes 191a and 191b includes at least one parallelogrammic electrode piece 196 illustrated in FIG. 4A and one parallelogrammic electrode piece 197 illustrated in FIG. 4B. The electrode pieces 196 and 197 illustrated in FIG. 4A and FIG. 4B are connected to form a base electrode 198 shown in FIG. 4C, and each sub-pixel electrode 191a and 191b has a structure based on the base electrode 198.

As shown in FIG. 4A and FIG. 4B, each of the electrode pieces 196 and 197 has a pair of oblique edges 196o and 197o and a pair of transverse edges 196t and 197t and substantially has a shape of a parallelogram. Each oblique edge 196o and 197o forms an oblique angle with the transverse edges 196t and 197t, and the oblique angle preferably ranges from about 45 degrees to about 135 degrees. Hereinafter, for convenience sake, the shape of the electrode piece 196 and 197 is classified according to the direction of inclination ("inclination direction") from a perpendicular state with respect to the transverse edges 196t and 197t, and it is referred to as "right-inclined" when the inclination direction is rightward as shown in FIG. 4A and as "left-inclined" when the inclination direction is leftward as shown in FIG. 4B.

The length of the transverse edges 196t and 197t of the electrode pieces 196 and 197, that is the width W, and the distance between the transverse edges 196t and 197t, that is the height H, may be determined freely in accordance with the size of the LC panel assembly 300. Also, the transverse edges 196t and 197t of each electrode piece 196 and 197 may be modified, for example curved or projected, in consideration of relationships with other parts, which modification may be included when referring to a parallelogram hereinafter.

The common electrode 270 includes cutouts 61 and 62 opposing the electrode pieces 196 and 197, and the electrode pieces 196 and 197 are divided into two sub-regions S1 and S2 with respect to the cutouts 61 and 62. The cutouts 61 and 62 include oblique portions 61o and 62o that are parallel with the oblique edges 196o and 197o of the electrode pieces 196 and 197, and transverse portions 61t and 62t that form obtuse angles with respect to the oblique portions 61o and 62o and overlap the transverse edges 196t and 197t of the electrode pieces 196 and 197.

Each sub-region S1 and S2 includes two primary edges defined by the oblique portions 61o and 62o of the cutouts 61 and 62 and the oblique edges 196o and 197o of the electrode pieces 196 and 197. The distance between the primary edges, that is the width of each sub-region S1 and S2, is preferably about 25 to 40 μm.

The base electrode 198 illustrated in FIG. 4C is formed by combining a right-inclined electrode piece 196 and a left-inclined electrode piece 197. The preferable angle formed by the right-inclined electrode piece 196 and the left-inclined electrode piece 197 is substantially a right angle, and the connection of the two electrode pieces 196 and 197 is made only at one portion. The portions that are not connected form a cutout 90, which is disposed at the concavely curved side. However, the cutout 90 may be omitted.

The outer transverse edges 196t and 197t of the two electrode pieces 196 and 197 form transverse edges 198t of the base electrode 198, and the corresponding oblique edges 196o and 197o of two electrode pieces 196 and 197 are connected to each other to form curved edges 198o1 and 198o2 of the base electrode 198.

The curved edges 198o1 and 198o2 include a convex edge 198o1 meeting and forming obtuse angles with respect to the transverse edges 198t, for example of about 135 degrees, and a concave edge 198o2 meeting and forming acute angles with respect to the transverse edges 198t, for example of about 45 degrees. A pair of oblique edges 196o and 197o meet each other substantially at right angles to each other to form the curved edges 198o1 and 198o2 so that the curved angles thereof are substantially right angles. Thus, the base electrode 198 may substantially have a shape of a simple concave hexagon formed in an arrow shape. The base electrode 198 may include one concavity formed by the concave edge 198o2.

A cutout 60 extends from the concave vertex CV of the concave edge 198o2 toward the convex vertex VV of the convex edge 198o1 substantially up to the middle of the base electrode 198.

Also, the cutouts 61 and 62 of the common electrode 270 are connected to each other to form the cutout 60. Here, the overlapped transverse portions 61t and 62t of the cutouts 61 and 62 are combined to form a transverse portion 60t1. This new cutout 60 may be described again as follows.

The cutout 60 includes a curved portion 60o having a curve point CP, a middle transverse portion 60t1 connected to the curve point CP of the curved portion 60o, and a pair of terminal transverse portions 60t2 that are connected to the respective ends of the curved portion 60o. The curved portion 60o of the cutout 60 has a pair of oblique portions meeting each other at a right angle, and the curved portion 60o is substantially parallel to the curved edges 198o1 and 198o2 of the base electrode 198 and bisects the base electrode 198 into left and right halves. The middle transverse portion 60t1 of the cutout 60 forms an obtuse angle with the curved portion 60o, for example of about 135 degrees, and extends substantially toward the convex vertex VV of the base electrode 198. The terminal transverse portions 60t2 are aligned with the transverse edges 198t of the base electrode 198 and form obtuse angles with the curved portion 60o, for example of about 135 degrees.

The base electrode 198 and the cutout 60 substantially have inversion symmetry with respect to an imaginary straight line (hereinafter, referred to as a "transverse center-line") connecting the convex vertex VV and the concave vertex CV of the base electrode 198.

Now, characteristics of the respective pixel electrodes illustrated in FIG. 3 will be further described.

In a pixel electrode 191 illustrated in FIG. 3, the area of the first sub-pixel electrode 191a is smaller than the area of the second sub-pixel electrode 191b. Particularly, the height of the second sub-pixel electrode 191b is greater than the height of the first sub-pixel electrode 191a, and the width of the first sub-pixel electrode 191a and the electrode pieces of the second sub-pixel electrode 191b are substantially the same. The number of electrode pieces of the second sub-pixel electrode 191b is greater than the number of electrode pieces of the first sub-pixel electrode 191b.

The first sub-pixel electrode 191a includes a left-inclined electrode piece 197 and a right-inclined electrode piece 196, and it has substantially the same structure as the base electrode 198 illustrated in FIG. 4C.

The second sub-pixel electrode 191b is formed by a combination of two or more left-inclined electrode pieces 197 and two or more right-inclined electrode pieces 196, and it includes a base electrode 198 illustrated in FIG. 4C and left-inclined and right-inclined electrode pieces 196 and 197 combined with the base electrode 198.

The second sub-pixel electrode 191b illustrated in FIG. 3 comprises altogether six electrode pieces 191b1-191b6, two electrode pieces 191b6 and 191b5 of which are disposed above and below the first sub-pixel electrode 191a, respectively. The pixel electrode 191b has a structure that is curved three times, which has excellent properties for displaying vertical lines compared to a structure that is curved once. Moreover, since the transverse portions 61t and 62t of the cutouts 61 and 62 of the common electrode 270 are combined at the place where the electrode pieces 191a1 and 191a2 of the first sub-pixel electrode 191a and the electrode pieces 191b5 and 191b6 of the second sub-pixel electrode 191b are adjacent to each other to form a transverse portion, the aperture ratio is further increased.

The height of the electrode pieces 191a1, 191a2, 191b1, and 191b2 disposed in the central area of the pixel electrode 191 is different from the height of the electrode pieces 191b3-191b6 disposed above and below the electrode pieces 191a1, 191a2, 191b1, and 191b2. For example, the height of the upper and lower electrode pieces 191b3-191b6 is about half of the height of the middle electrode pieces 191a1, 191a2, 191b1, and 191b2, and accordingly the area ratio of the first sub-pixel electrode 191a to the second sub-pixel electrode 191b becomes about 1:2. In this way, the desired area ratio can be obtained by regulating the height of the upper and lower electrode pieces 191b3-191b6, and the preferable area ratio is about 1:1.1 to 1:3.

In FIG. 3, the position relationship and the curved direction of the first and second sub-pixel electrodes 191a and 191b may be modified, and the pixel electrode 191 in FIG. 3 may be modified by inversion symmetrical transformation up and down or right and left, or by rotational transformation.

Referring to FIG. 1 again, the gray voltage generator 800 generates a plurality of gray voltages (or reference gray voltages) related to the transmittance of the pixels PX. However, the gray voltage generator 800 may generate only a given number of gray voltages (referred to as reference gray voltages) instead of generating all of the gray voltages.

The gate driver 400 is connected to the gate lines of the LC panel assembly 300 and synthesizes a gate-on voltage Von and a gate-off voltage Voff from an external device to generate gate signals Vg for application to the gate lines.

The data driver 500 is connected to the data lines of the LC panel assembly 300 and applies data voltages Vd, which are selected from the gray voltages supplied from the gray voltage generator 800, to the data lines. However, in the case when the gray voltage generator 800 supplies only reference gray voltages of a predetermined number rather than supplying voltages for all grays, the data driver 500 divides the reference gray voltages to generate gray voltages for all grays, from which data signals are selected.

The signal controller 600 controls the gate driver 400 and the data driver 500, etc.

Each of the drivers 400, 500, 600, and 800 mentioned above may be directly mounted on the LC panel assembly 300 in the form of at least one integrated circuit ("IC") chip, or it may be mounted on a flexible printed circuit film (not shown) in a tape carrier package ("TCP") type that is attached to the LC panel assembly 300, or it may be mounted on a separate printed circuit board (not shown). On the other hand, each of the drivers 400, 500, 600, and 800 may be integrated into the LC panel assembly 300. Also, the drivers 400, 500, 600, and 800 may be integrated into a single chip, and in this case, at least one thereof or at least one circuit element forming those may be located outside of the single chip.

Now, the operation of the LCD will be described.

The signal controller 600 is supplied with input image signals R, G, and B and input control signals for controlling the display thereof from an external graphics controller (not shown). The input image signals R, G, and B include luminance information of each pixel PX and the luminance has a predetermined number of, for example, $1024(=2^{10})$, $256(=2^8)$, or $64(=2^6)$ grays. The input control signals include, for example, a vertical synchronization signal Vsync, a horizontal synchronization signal Hsync, a main clock signal MCLK, a data enable signal DE, etc.

Based on the input control signals and the input image signals R, G, and B, the signal controller 600 appropriately processes the input image signals R, G, and B for the operating condition of the LC panel assembly 300 and the data driver 500, and generates gate control signals CONT1 and data control signals CONT2. Then, the signal controller 600 transmits the gate control signals CONT1 to the gate driver 400 and transmits the processed image signals DAT and the data control signals CONT2 to the data driver 500. The output image signals DAT are digital signals having a predetermined number of values (or grays).

The gate control signals CONT1 include a scanning start signal STV for instructing the start of a scanning operation and at least one clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of a start of image data transmission for a packet of sub-pixels, a load signal LOAD for instructing application of the data signals to the LC panel assembly 300, and a data clock signal HCLK. The data control signal CONT2 may further include an inversion signal RVS for reversing the polarity of the data signals with respect to the common voltage Vcom (hereinafter, "polarity of the data signals with respect to the common voltage Vcom" is referred to as "polarity of the data signals").

Responding to the data control signals CONT2 from the signal controller 600, the data driver 500 sequentially receives the digital image signals DAT for the packet of sub-pixels, selects gray voltages corresponding to the respective digital image signals DAT, converts the digital image signals DAT into analog data signals, and applies the analog data signals to the corresponding data lines as data voltages Vd.

The gate driver 400 applies the gate-on voltage Von to the gate lines in response to the gate control signals CONT1 from the signal controller 600, thereby turning on the switching elements connected to the gate lines. Then, data signals applied to the data lines are applied to the corresponding sub-pixels through the turned-on switching elements.

Here, referring to FIG. 3, when the first sub-pixel electrode 191a and the second sub-pixel electrode 191b forming a pixel electrode 191 are coupled to respective switching elements, that is, each sub-pixel has its own respective switching element, the two sub-pixels may be supplied with respective data voltages Vd at different times through the same data line or through different data lines or at the same time through different data lines. Alternatively, when the first sub-pixel electrode 191a is connected to a switching element (not shown) and the second sub-pixel electrode 191b is capacitively coupled to the first sub-pixel electrode 191a, only the first sub-pixel electrode 191a is supplied with data voltages through the switching element, and the second sub-pixel electrode 191b is supplied with voltages depending on the voltages of the first sub-pixel electrode 191a. Here, the voltage of the first sub-pixel electrode 191a having a relatively small area is higher than the voltage of the second sub-pixel electrode 191b having a relatively large area.

In this way, when the voltage difference is generated across the first or the second LC capacitor Clca or Clcb, a primary electric field that is substantially perpendicular to the surfaces of the panels 100 and 200 is generated in the LC layer 3. Hereinafter, the pixel electrodes 191 and the common electrode 270 are altogether referred to as "field generating electrodes". Then, the LC molecules in the LC layer 3 tilt in response to the electric field such that their long axes become perpendicular to the electric field direction, and the degree of the tilt of the LC molecules determines the change of the polarization of incident light onto the LC layer 3. This change of the light polarization causes a change of light transmittance through the polarizers, and in this way, the LCD displays images.

The tilt angle of the LC molecules depends on the strength of the electric field. Since the voltages of the two LC capacitors Clca and Clcb are different from each other, the tilt angles of the LC molecules are also different from each other and thus the luminances of the two sub-pixels 191a and 191b are different from each other. Therefore, voltage of the first LC capacitor Clca and voltage of the second LC capacitor Clcb can be adjusted so that an image viewed from a lateral side is most similar to an image viewed from the front, that is, the lateral gamma curve can be made to be most similar to the frontal gamma curve, thereby improving the lateral visibility.

Also, when the area of the first sub-pixel electrode 191a applied with higher voltage is formed to be smaller than the area of the second sub-pixel electrode 191b, the lateral gamma curve further approaches the front gamma curve. Particularly, when the area ratio of the first to the second sub-pixel electrodes 191a and 191b is approximately 1:2 to 1:3 as illustrated in FIG. 3 to FIG. 4C, the lateral gamma curve is much more similar to the frontal gamma curve, thereby further improving the lateral visibility.

The edges of the sub-pixel electrodes 191a and 191b and the cutouts 91a, 91b, 71a, and 71b of the electric field-generating electrodes 191 and 270 distort the primary electric field and give it a horizontal component, which initially determines the tilt directions of the LC molecules in the LC layer 3. The horizontal component of the primary electric field is perpendicular to the edges of the sub-pixel electrodes 191a and 191b and the edges of the cutouts 71a and 71b.

Referring to FIG. 3, since the LC molecules on each sub-area divided by the cutouts 71a and 71b substantially tilt vertically with respect to the major edges, the azimuthal distribution of the tilt directions is localized to four directions. In this way, if tilt directions of the LC molecules are varied, the reference viewing angle of the LCD is increased.

Meanwhile, the direction of a secondary electric field that is secondarily generated due to the voltage difference between the sub-pixel electrodes 191a and 191b is perpendicular to each of the major edges of the sub-areas. Accordingly, the direction of the secondary electric field coincides with that of the horizontal component of the primary electric field. Consequently, the secondary electric field between the sub-pixel electrodes 191a and 191b enhances the determination of the tilt directions of the LC molecules.

By repeating this procedure by a unit of the horizontal period (which is also denoted as "1H" and is equal to one period of the horizontal synchronization signal Hsync and the data enable signal DE), all pixels PX are applied with data signals, thereby displaying an image for a frame.

When the next frame starts after one frame is finished, the inversion signal RVS applied to the data driver 500 is controlled such that the polarity of the data signals Vd applied to each pixel PX is reversed to be opposite to the polarity in the previous frame (which is referred to as "frame inversion"). Here, even during one frame, the polarity of the data signal Vd flowing in a data line may vary in accordance with the characteristics of the inversion signal RVS (for example, row inversion and dot inversion), or the polarities of the data signals Vd applied to a packet of pixels PX may be different from each other (for example, column inversion and dot inversion).

Now, referring to FIG. 5 to FIG. 8 and FIG. 1 to FIG. 4C described above, an exemplary LC panel assembly according to an exemplary embodiment of the present invention will be described.

Figure 5:
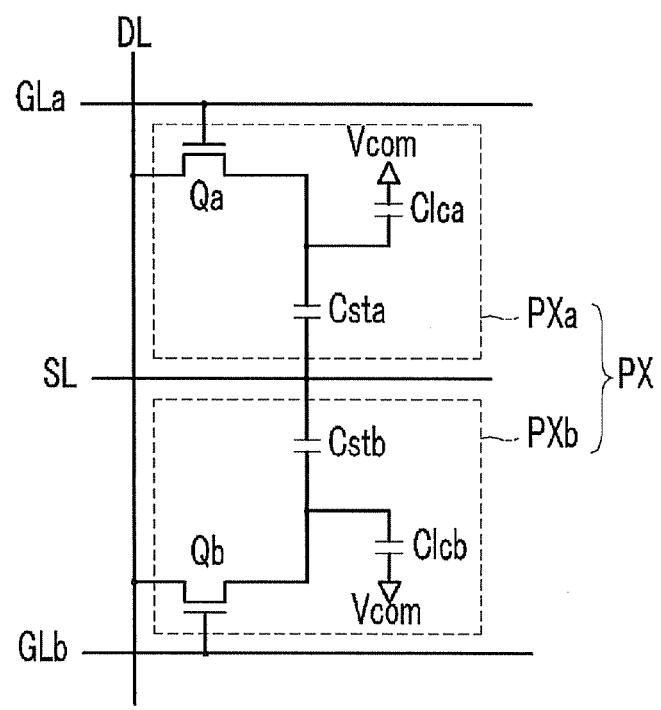
FIG. 5 is an equivalent circuit diagram of an exemplary pixel of an exemplary LC panel assembly according to an exemplary embodiment of the present invention.

FIG. 5 is an equivalent circuit diagram of an exemplary pixel of an exemplary LC panel assembly according to an exemplary embodiment of the present invention.

Referring to FIG. 5, an LCD panel assembly includes signal lines including a plurality of pairs of gate lines GLa and GLb, a plurality of data lines DL, and a plurality of storage electrode lines SL, and a plurality of pixels PX connected to the signal lines.

Each pixel PX includes a pair of sub-pixels PXa and PXb, and each sub-pixel PXa/PXb includes a switching element Qa/Qb that is respectively connected to the corresponding gate line GLa/GLb and a data line DL, an LC capacitor Clca/Clcb that is connected to the switching element Qa/Qb, and a storage capacitor Csta/Cstb that is connected to the switching element Qa/Qb and the storage electrode line SL.

Each switching element Qa/Qb including a thin film transistor ("TFT") is a three-terminal element provided on the lower panel 100, and has a control terminal, such as a gate electrode, connected to a gate line GLa/GLb, an input terminal, such as a source electrode, connected to a data line DL, and an output terminal, such as a drain electrode, connected to an LC capacitor Clca/Clcb and a storage capacitor Csta/Cstb.

The storage capacitor Csta/Cstb that functions as an auxiliary capacitor for the LC capacitor Clca/Clcb is formed by overlapping a storage electrode line SL which is provided on the lower panel 100 with a sub-pixel electrode PEa/PEb via an insulator disposed there between, and the storage electrode line SL is supplied with a predetermined voltage such as the common voltage Vcom. Alternatively, the storage capacitors Csta and Cstb may be formed by overlapping the sub-pixel electrodes PEa and PEb with a previous gate line right above via an insulator.

Here, a detailed description of the LC capacitors Clca and Clcb, which were described above, will be omitted.

In an LCD including this LC panel assembly, the signal controller 600 may receive input image signals R, G, and B for a pixel PX and convert them into output image signals DAT for two sub-pixels PXa and PXb, which are transmitted to the data driver 500. Separate sets of gray voltages for the two sub-pixels PXa and PXb may be generated by the gray voltage generator 800, and the sets of gray voltages may be alternately applied to the data driver 500 or may be alternately selected by the data driver 500, thereby applying different voltages to the two sub-pixels PXa and PXb. However, it is preferable to compensate the image signals or generate sets of gray voltages such that the merged gamma curve of the two sub-pixels PXa and PXb is close to the frontal reference gamma curve. For example, the frontal merged gamma curve is made in accordance with the frontal reference gamma curve that is determined to be the most appropriate for the LC panel assembly, and the lateral merged gamma curve is made to be most similar to the frontal reference gamma curve.

An example of the LC panel assembly illustrated in FIG. 5 will be described with reference to FIG. 6, FIG. 7, and FIG. 8 along with FIG. 3 described above.

Figure 6:
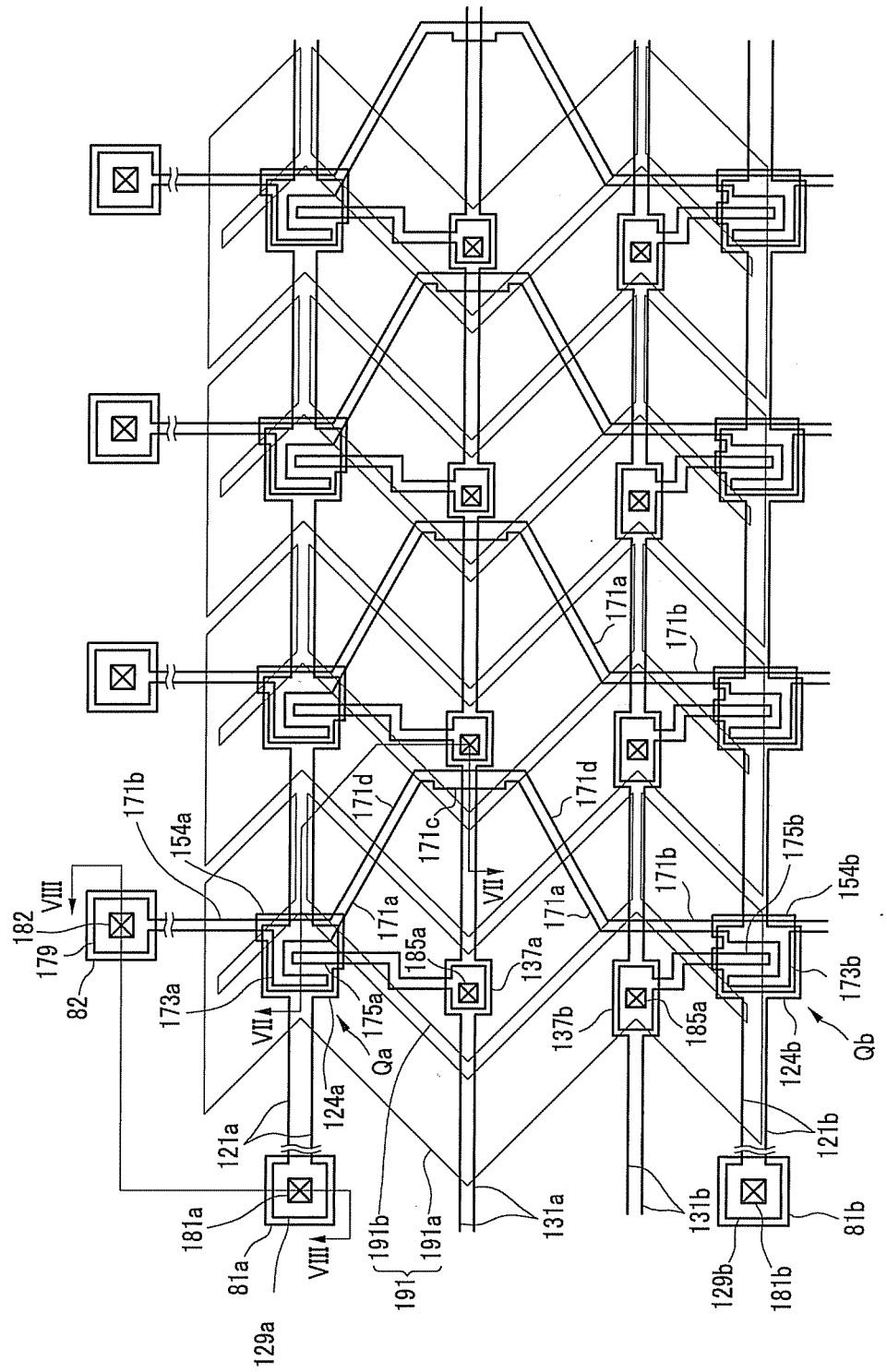
FIG. 6 is a layout view of an exemplary LC panel assembly according to an exemplary embodiment of the present invention.
Figure 7:
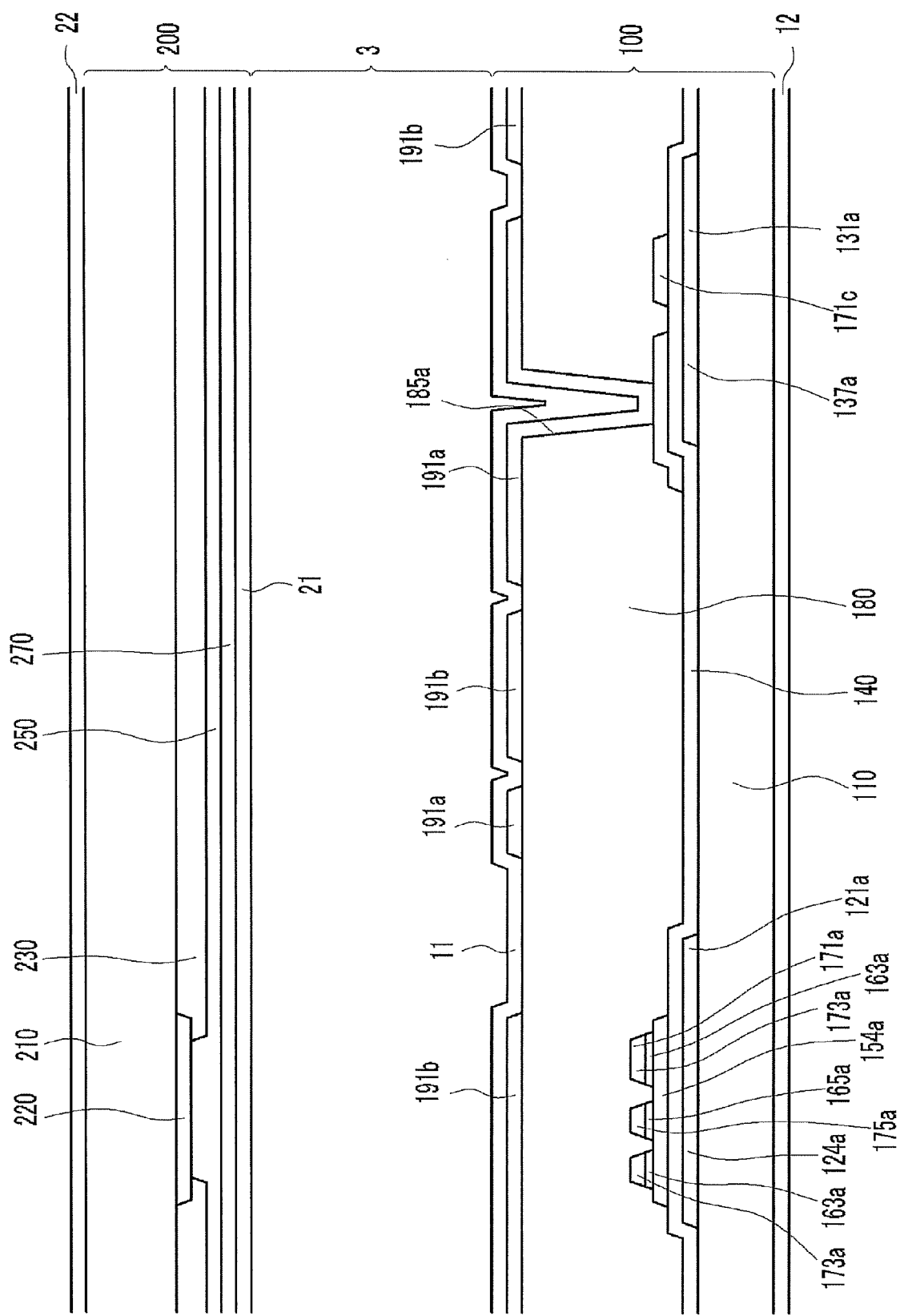
FIG. 7 and FIG. 8 are cross-sectional views of the exemplary LC panel assembly illustrated in FIG. 6 taken along lines VII-VII and VIII-VIII.
Figure 8:
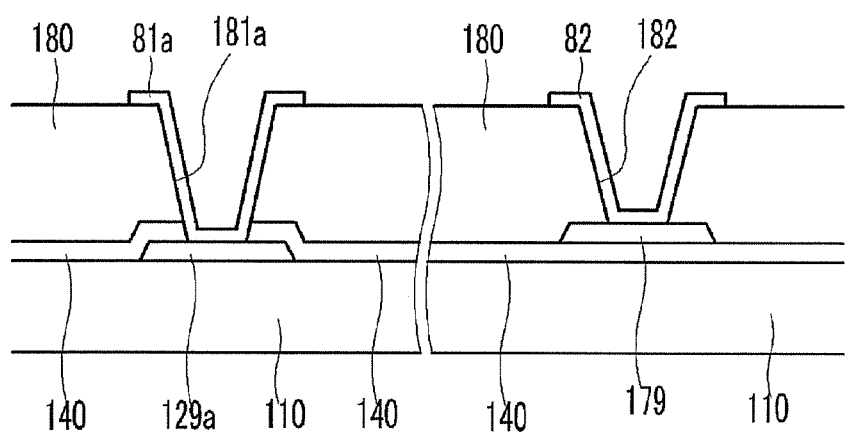

FIG. 6 is a layout view of an exemplary LC panel assembly according to an exemplary embodiment of the present invention, and FIG. 7 and FIG. 8 are cross-sectional views of the exemplary LC panel assembly illustrated in FIG. 6 taken along line VII-VII and line VIII-VIII.

Referring to FIG. 6 and FIG. 7, the LC panel assembly includes a lower panel 100 and an upper panel 200 opposing each other, and an LC layer 3 interposed between the two panels 100 and 200.

First, the lower panel 100 will be described.

A plurality of gate conductors including a plurality of pairs of first and second gate lines 121a and 121b and a plurality of pairs of first and second storage electrode lines 131a and 131b are formed on an insulating substrate 110 preferably made of transparent glass or plastic.

The first and the second gate lines 121a and 121b for transmitting gate signals extend substantially in a transverse direction, a first direction, and are disposed in an upper position and a lower position, respectively.

Each of the first gate lines 121a includes a plurality of first gate electrodes 124a protruding from the first gate lines 121a and an end portion 129a having a large area for connection with another layer or the gate driver 400. Each of the second gate lines 121b includes a plurality of second gate electrodes 124b protruding from the second gate lines 121b and an end portion 129b having a large area for connection with another layer or the gate driver 400. When the gate driver 400 is integrated onto the substrate 110, the gate lines 121a and 121b may extend so as to be directly connected to the gate driver 400.

The storage electrode lines 131a and 131b that are supplied with a predetermined voltage such as a common voltage Vcom extend substantially in a transverse direction, the first direction. The first and second storage electrode lines 131a and 131b are disposed between the first gate line 121a and the second gate line 121b. Each storage electrode line 131a and 131b includes a plurality of pairs of first and second storage electrodes 137a and 137b extending upward and downward from the storage electrode lines 131a and 131b. However, the shapes and arrangements of the storage electrode lines 131a and 131b including the storage electrodes 137a and 137b may be modified in various ways.

The gate conductors 121a, 121b, 131a, and 131b may be made of an aluminum—(Al) containing metal such as Al and an Al alloy, a silver—(Ag) containing metal such as Ag and a Ag alloy, a copper—(Cu) containing metal such as Cu and a Cu alloy, a molybdenum—(Mo) containing metal such as Mo and a Mo alloy, chromium (Cr), tantalum (Ta), and titanium (Ti). Alternatively, the gate conductors 121a, 121b, 131a, and 131b may have a multi-layered structure including two conductive layers (not shown) having different physical properties. One of the two conductive layers is preferably made of a low resistivity metal such as an Al-containing metal, a Ag-containing metal, or a Cu-containing metal for reducing signal delay or voltage drop, while the other conductive layer is preferably made of a material such as a Mo-containing metal, Cr, Ti, and Ta, which has good physical, chemical, and electrical contact characteristics with other materials such as indium tin oxide ("ITO") or indium zinc oxide ("IZO"). Good examples of the combination of two layers include a pair of a lower Cr layer and an upper Al (alloy) layer and a pair of a lower Al (alloy) layer and an upper Mo (alloy) layer. However, the gate conductors 121a, 121b, 131a, and 131b may be made of many various metals or conductors besides the above.

The lateral sides of the gate conductors 121a, 121b, 131a, and 131b are inclined relative to a surface of the substrate 110, and the preferable inclination angle thereof ranges from about 30 degrees to about 80 degrees.

A gate insulating layer 140 preferably made of silicon nitride (SiNx) or silicon oxide (SiOx) is formed on the gate conductors 121a, 121b, 131a, and 131b and on exposed portions of the insulating substrate 110.

A plurality of first and second semiconductor islands 154a and 154b preferably made of hydrogenated amorphous silicon ("a-Si") or polysilicon are formed on the gate insulating layer 140. The first and second semiconductors 154a and 154b are disposed on the first and second gate electrodes 124a and 124b, respectively.

A pair of ohmic contact islands 163a and 165a is formed on each of the first semiconductor islands 154a, and a pair of ohmic contact islands (not shown) is also formed on each of the second semiconductor islands 154b. The ohmic contacts 163a and 165a are preferably made of n+ hydrogenated a-Si heavily doped with an n-type impurity such as phosphorus (P) or silicide.

The lateral sides of the semiconductors 154a and 154b and the ohmic contacts 163a and 165a are also inclined relative to a surface of the substrate 110, and the preferable inclination angle thereof ranges from about 30 degrees to about 80 degrees.

A plurality of data conductors including a plurality of data lines 171 and a plurality of pairs of first and second drain electrodes 175a and 175b are formed on the ohmic contacts 163a and 165a and the gate insulating layer 140.

The data lines 171 for transmitting data signals extend substantially in the longitudinal direction, a second direction substantially perpendicular to the first direction, and intersect the gate lines 121a and 121b and the storage electrode lines 131a and 131b. Each data line 171 is curved four times at a middle region thereof, and the upper part with respect to the first gate line 121a and the lower part with respect to the second storage electrode line 131b are disposed in a straight line.

Each data line 171 includes a plurality of pairs of first and second source electrodes 173a and 173b branched out toward the first and second gate electrodes 124a and 124b and an end portion 179 having a large area for connection with another layer or a data driver 500. When the data driver 500 is integrated on the substrate 110, the data lines 171 may extend so as to be directly connected to it.

The first and second drain electrodes 175a and 175b are separated from each other and are also separated from the data lines 171.

The first/second drain electrode 175a/175b opposes the first/second source electrode 173a/173b with respect to the first/second gate electrode 124a/124b, and includes an end portion 177a/177b having a large area and a stick-shaped end portion. The end portions 177a and 177b having a large area overlapping the first and the second storage electrodes 137a and 137b, respectively, and the stick-shaped end portions are partially surrounded by the first and second source electrodes 173a and 173b that are curved.

The first/second gate electrode 124a/124b, the first/second source electrode 173a/173b, and the first/second drain electrode 175a/175b, along with the first/second semiconductor 154a/154b, form the first/second TFT Qa/Qb having a channel formed in the first/second semiconductor 154a/154b disposed between the first/second source electrode 173a/173b and the first/second drain electrode 175a/175b.

The data conductors 171, 175a, and 175b are preferably made of a refractory metal such as Mo, Cr, Ta, and Ti or an alloy thereof. Also, the data line 171 and the drain electrodes 175a and 175b may have a multi-layered structure including a refractory metal layer (not shown) and a conductive layer (not shown) having low resistivity. An example of the multi-layered structure includes double layers of a lower Cr or Mo (alloy) layer and an upper Al (alloy) layer, and triple layers of a lower Mo (alloy) layer, an intermediate Al (alloy) layer, and an upper Mo (alloy) layer. However, the data conductors 171, 175a, and 175b may be made of many various metals or conductive materials besides the above.

The lateral sides of the data conductors 171, 175a, and 175b are also inclined relative to a surface of the substrate 110, and the inclination angles thereof are preferably in a range of about 30 degrees to about 80 degrees.

The ohmic contacts 163a and 165a are interposed only between the underlying semiconductors 154a and 154b and the overlying data conductors 171, 175a, and 175b thereon, and reduce the contact resistance there between. The semiconductors 154a and 154b include exposed portions that are not covered with the data conductors 171, 175a, and 175b such as portions located between the source electrodes 173a and 173b and the drain electrodes 175a and 175b.

A passivation layer 180 is formed on the data conductors 171, 175a, and 175b and the exposed portions of the semiconductors 154a and 154b. The passivation layer 180 may be further formed on exposed portions of the gate insulating layer 140. The passivation layer 180 is preferably made of an inorganic insulator or an organic insulator, and the surface thereof may be flat. The organic insulator may have photosensitivity, and the preferable dielectric constant thereof is lower than about 4.0. However, the passivation layer 180 may have a double-layered structure including a lower inorganic layer and an upper organic layer so as not to harm the exposed portions of the semiconductors 154a and 154b and to make the most of the excellent insulating characteristics of an organic layer.

The passivation layer 180 has a plurality of contact holes 182, 185a, and 185b respectively exposing the end portions 179 of the data lines 171 and the large end portions 177a and 177b of the first and second drain electrodes 175a and 175b, and the passivation layer 180 and the gate insulating layer 140 have a plurality of contact holes 181a and 181b respectively exposing the end portions 129a and 129b of the gate lines 121a and 121b.

A plurality of pixel electrodes 191 and a plurality of contact assistants 81a, 81b, and 82 are formed on the passivation layer 180. These may be made of a transparent conductor such as ITO or IZO, or a reflective metal such as Al, Ag, Cr, or an alloy thereof.

Each of the pixel electrodes 191 opposes a color filter CF that is formed on the upper panel 200, as will be further described below, and each color filter CF represents one color in the set of colors, such as primary colors, and such as red (R), green (G), and blue (B), respectively. As described above, each pixel electrode 191 includes a pair of first and second sub-pixel electrodes 191a and 191b that are separated from each other.

The first sub-pixel electrodes 191Ra, 191Ga, and 191Ba are connected to each of the wide ends 177a of the first drain electrodes 175a through the contact holes 185a, respectively, and the second sub-pixel electrodes 191Rb, 191Gb, 191Bb are connected to each of the wide ends 177b of the second drain electrodes 175b through the contact holes 185b.

The pixel electrodes 191 overlap the data lines 171 with the passivation layer 180 interposed there between. Each data line 171 overlaps every adjacent pixel electrode 191. That is, a data line 171 overlaps the first and second sub-pixel electrodes 191a and 191b of a pixel electrode 191 connected to the data line 171 through the first and second TFTs, and also overlaps the first and second sub-pixel electrodes 191a and 191b of another pixel electrode 191 adjacent to the former pixel electrode 191. Hereinafter, with respect to a data line 171, the pixel electrode 191 and the first and second sub-pixel electrodes 191a and 191b connected to the data line 171 are referred to as a self pixel electrode 191 and self first and second sub-pixel electrodes 191a and 191b, respectively, and the pixel electrode 191 and the first and second sub-pixel electrodes 191a and 191b that are adjacent to the former pixel electrode 191 are referred to as an adjacent pixel electrode 191 and adjacent first and second sub-pixel electrodes 191a and 191b, respectively.

The data lines 171 do not extend straight, but are instead curved or bent several times in order to be overlapped by both the self pixel electrodes 191 and the adjacent pixel electrodes 191. That is, a data line 171 extends in a longitudinal direction to be overlapped by the self second sub-pixel electrode 191b, and then it is curved at about the point where it meets the first gate line 121a to be overlapped by the self first sub-pixel electrode 191a and the adjacent second sub-pixel electrode 191b. Next, the data line 171 is curved within the area where it is overlapped by the adjacent second sub-pixel electrode 191b and extends perpendicular to the first storage electrode line 131a and is overlapped by the adjacent second sub-pixel electrode 191b. The data line 171 is again curved within the area where it is overlapped by the adjacent second sub-pixel electrode 191b and is overlapped by the adjacent second sub-pixel electrode 191b and then the self first sib-pixel electrode 191a. Next, the data line 171 is curved once again at about the point where it meets the second storage electrode line 131b to be overlapped by the self second sub-pixel electrode 191b. That is, the data line 171 is curved or bent four times in all, and the upper part with respect to the first gate line 121a and the lower part with respect to the second storage electrode line 131b are disposed in a straight line. That is, the upper part with respect to the first gate line 121a and the lower part with respect to the second storage electrode line 131b extend in the longitudinal or second direction. Also, this structure of the data line 171 has vertical symmetry with respect to the first storage electrode line 131a.

In the meantime, if the portions where the data line 171 overlaps the self first sub-pixel electrode 191a, the self second sub-pixel electrode 191b, the adjacent first sub-pixel electrode 191a, and the adjacent second sub-pixel electrode 191b are referred to as the first portion 171a, the second portion 171b, and the fourth portion 171d, respectively, the length of the third portion 171c is different from the first, second, and fourth portions 171a, 171b, and 171d. That is, the first, second, and fourth portions 171a, 171b, and 171d are divided into two parts located above and below the first storage electrode line 131a, but the third portion 171c crosses the first storage electrode line 131a and includes one part. Also, the width of the third portion 171c is wider than the width of the first, the second, and the fourth portions 171a, 171b, and 171d, for example by about two times. Therefore, the area of the first portion 171a and the area of the third portion 171c are substantially the same, and the area of the second portion 171b and the area of the fourth portion 171d are substantially the same.

When the above-mentioned description is described again with respect to one pixel electrode 191, the pixel electrode 191 overlaps both the data line 171 connected to the pixel electrode 191 and an adjacent data line 171. A parasitic capacitance between a data line 171 and a pixel electrode 191 is generated to affect the pixel electrode voltage. Since data voltages having opposite polarities to each other are applied to adjacent data lines 171 when a column inversion driving is performed, if a pixel electrode 191 overlaps two data lines 171 applied with data voltages having opposite polarities to each other simultaneously, changes of the pixel electrode voltage due to the parasitic capacitances between each of the two adjacent data lines 171 and the pixel electrode 191 occur simultaneously in positive-polarity and negative-polarity directions, and counteract each other. Therefore, occurrence of vertical cross-talk due to a parasitic capacitance generated between a data line 171 and a pixel electrode 191 can be minimized.

The storage electrode line 131a, the large end portion 177a of the drain electrode 175a, and the contact hole 185a are located on the transverse center-line of the sub-pixel electrodes 191a and 191b. The straight line connecting the curve points of the sub-pixel electrodes 191a and 191b is the boundary of the sub-areas described above, where the arrangements of the LC molecules are disordered to yield texture. Therefore, with the disposition in this way, the aperture ratio can be improved while blocking the texture.

Since the remainder of the shapes and disposition of the pixel electrode 191 were previously described above with reference to FIG. 3, a detailed description thereof will be omitted.

The first/second sub-pixel electrode 191Ra, 191Ga, and 191Ba/191Rb, 191Gb, and 191Bb and the common electrode 270 provided on the upper panel 200 along with the LC layer 3 disposed there between form a first/second LC capacitor Clca/Clcb respectively to store applied voltages even after the TFT Qa/Qb is turned off.

The first sub-pixel electrodes 191Ra, 191Ga, and 191Ba and a first drain electrode 175a connected to each first sub-pixel electrode 191Ra, 191Ga, and 191Ba overlap a storage electrode 137a of each pixel area via the gate insulating layer 140 interposed there between to form a first/second storage capacitor Csta/Cstb, and the first/second storage capacitor Csta/Cstb enhances the voltage storing capacity of the first/second LC capacitor Clca/Clcb.

The contact assistants 81a, 81b, and 82 are connected to the end portions 129a and 129b of the gate lines 121a and 121b and the end portion 179 of the data line 171 through the contact holes 181a, 181b, and 182, respectively. The contact assistants 81a, 81b, and 82 supplement adhesive property of the end portions 129a and 129b of the gate lines 121a and 121b and the end portions 179 of the data lines 171 to exterior devices, and protect them.

Next, a description of the upper panel 200 follows.

A light blocking member 220 is formed on an insulating substrate 210 preferably made of transparent glass or plastic. The light blocking member 220 includes curved portions facing the curved edges of the pixel electrodes 191 and quadrilateral portions facing the TFTs, and the light blocking member 220 defines opening areas opposed to the pixel electrodes 191 and also prevents the leakage of light between the pixel electrodes 191.

A plurality of color filters 230 are also formed on the substrate 210 and the light blocking member 220. The color filters 230 are disposed substantially in the areas enclosed by the light blocking member 220, and may extend in a longitudinal direction substantially along the pixel electrodes 191. Each of the color filters 230 may represent one of the colors in a set of colors, such as primary colors, such as red, green, and blue. In an alternative embodiment, the color filters 230 may be formed on the lower panel 100.

An overcoat 250 is formed on the color filters 230 and the light blocking member 200. The overcoat 250 is preferably made of an insulator, such as an organic insulator, and it prevents the color filters 230 from being exposed and also provides a flat surface. In alternative embodiments, the overcoat 250 may be omitted.

A common electrode 270 is formed on the overcoat 250.

Alignment layers 11 and 21 are coated on inner surfaces of the panels 100 and 200, and they may be homeotropic.

Polarizers 12 and 22 are provided on outer surfaces of the panels 100 and 200 and their polarization axes may be perpendicular to each other, with one polarization axis preferably parallel to the gate lines 121a and 121b. One of the polarizers 12 and 22 may be omitted when the LCD is a reflective LCD.

The LCD may include a backlight unit (not shown) for supplying light to the polarizers 12 and 22, a retardation film, the panels 100 and 200, and the LC layer 3.

The LC layer 3 is in a state of negative dielectric anisotropy, and the LC molecules in the LC layer 3 are aligned such that their long axes are substantially vertical to the surfaces of the panels 100 and 200 in the absence of an electric field.

Next, another example of the LC panel assembly illustrated in FIG. 5 will be described with reference to FIG. 9 and FIG. 10.

Figure 9:
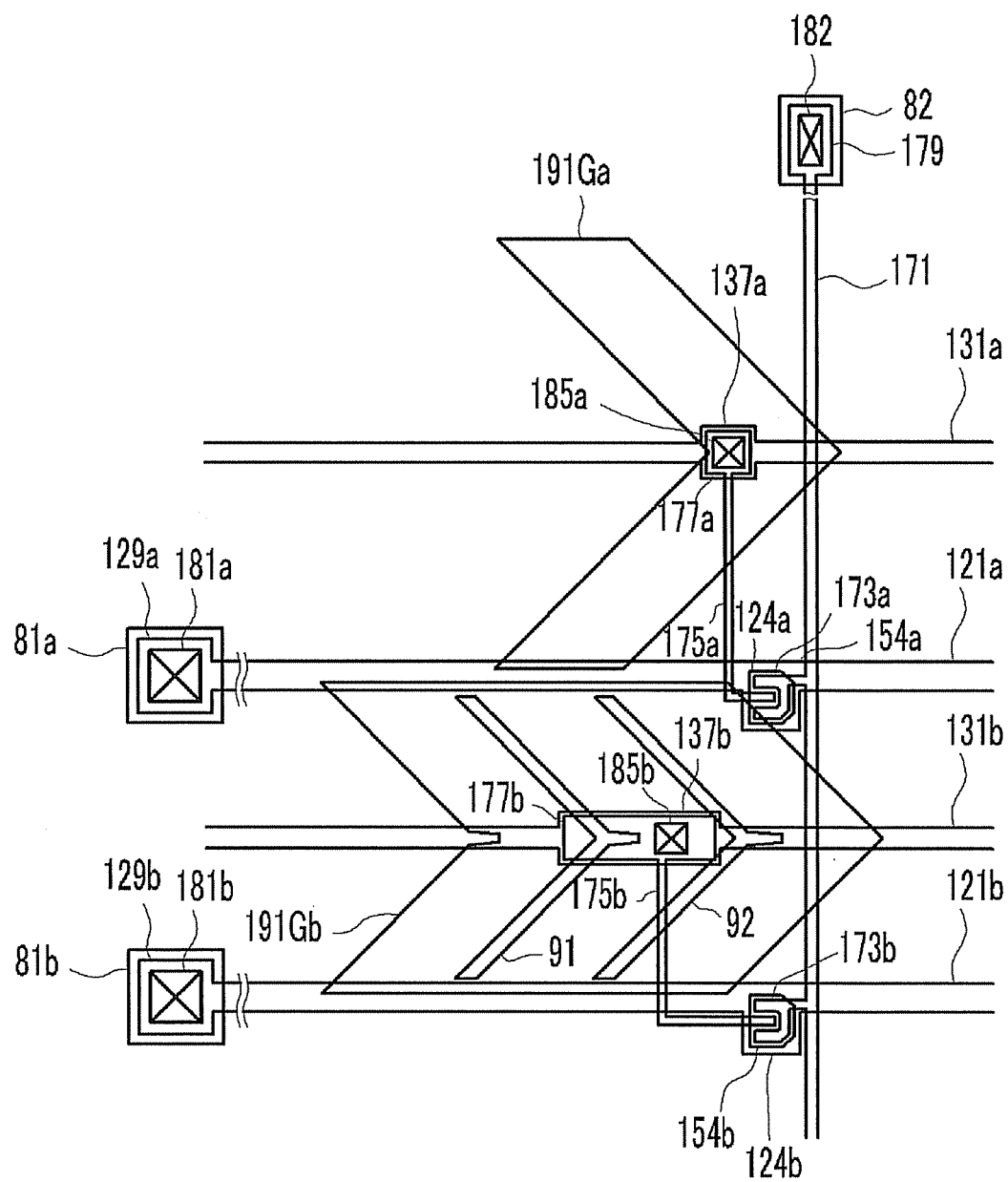
FIG. 9 is a layout view of an exemplary LC panel assembly according to another exemplary embodiment of the present invention.
Figure 10:
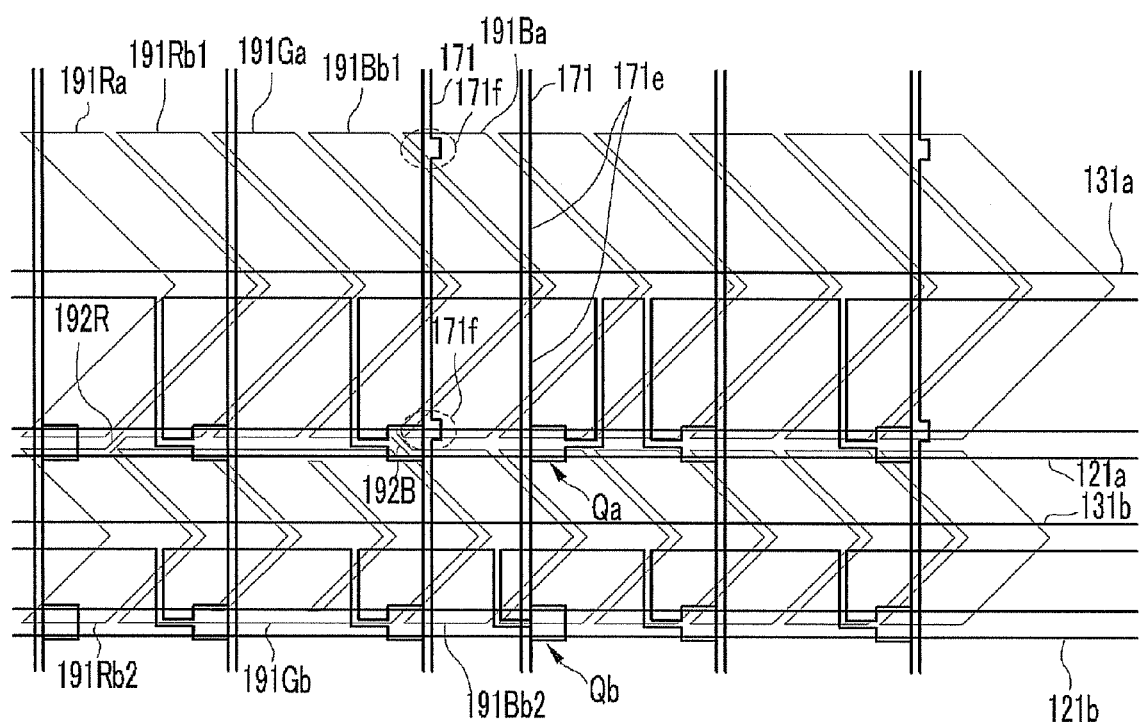
FIG. 10 is a drawing roughly illustrating the exemplary LC panel assembly illustrated in FIG. 9.

FIG. 9 is a layout view of an exemplary LC panel assembly according to another exemplary embodiment of the present invention, and FIG. 10 is a drawing roughly illustrating the exemplary LC panel assembly illustrated in FIG. 9.

Referring to FIG. 9 and FIG. 10, the LC panel assembly includes a lower panel and an upper panel (not shown), and an LC layer (not shown) interposed there between.

The layered structure of the LC panel assembly illustrated in FIG. 9 and FIG. 10 is substantially similar to the layered structure of the LC panel assembly illustrated in FIG. 6 to FIG. 8.

Regarding the lower panel, a plurality of gate conductors including a plurality of pairs of first and second gate lines 121a and 121b and a plurality of pairs of storage electrode lines 131a and 131b are formed on an insulating substrate (not shown). The first and second gate lines 121a and 121b include first and second gate electrodes 124a and 124b and end portions 129a and 129b, respectively. The storage electrode lines 131a and 131b include storage electrodes 137a and 137b. A gate insulating layer (not shown) is formed on the gate conductors 121a, 121b, 131a, and 131b and on the insulating substrate. A plurality of semiconductors 154a and 154b are formed on the gate insulating layer, and a plurality of ohmic contacts (not shown) is formed thereon. Data conductors including a plurality of data lines 171 and a plurality of first and second drain electrodes 175a and 175b are formed on the ohmic contacts. Each data line 171 includes a plurality of first and second source electrodes 173a and 173b and an end portion 179, and the drain electrodes 175a and 175b include end portions 177a and 177b having a large area. A passivation layer (not shown) is formed on the data conductors 171, 175a, and 175b and the exposed portions of the semiconductors 154a and 154b, and on the exposed portions of the gate insulating layer, and the passivation layer and the gate insulating layer have a plurality of contact holes 181a, 181b, 182, 185a, and 185b. A plurality of pixel electrodes 191 including first and second sub-pixel electrodes 191a and 191b and a plurality of contact assistants 81a, 81b, and 82 are formed on the passivation layer. An alignment layer (not shown) is formed on the pixel electrodes 191, the contact assistants 81a, 81b, and 82, and the passivation layer.

Regarding the upper panel, a light blocking member, a common electrode 270, and an alignment layer are formed on an insulating substrate.

The shape of the pixel electrode 191 of the LC panel assembly illustrated in FIGS. 9 and 10 is different from that of the LC panel assembly illustrated in FIG. 6 to FIG. 8.

Each of the pixel electrodes 191 opposes a color filter CF which is formed on the upper panel and represents one of the colors in a set of colors, such as three primary colors, such as red (R), green (G), and blue (B), respectively. The pixel electrode 191 may be divided into three pixel electrodes 191R, 191G, and 191B facing each color filter CF and separated from each other. Each pixel electrode 191R, 191G, and 191B includes a pair of first and second sub-pixel electrodes 191Ra, 191Rb, 191Ga, 191Gb, 191Ba, and 191Bb separated from each other.

Each of the first and second sub-pixel electrodes 191Ra, 191Rb, 191Ga, 191Gb, 191Ba, and 191Bb also includes at least one parallelogrammic electrode piece 196 illustrated in FIG. 4A and one parallelogrammic electrode piece 197 illustrated in FIG. 4B. The electrode pieces 196 and 197 illustrated in FIG. 4A and FIG. 4B are connected to form a base electrode 198 shown in FIG. 4C, and each sub-pixel electrode 191Ra, 191Rb, 191Ga, 191Gb, 191Ba, and 191Bb has a structure based on the base electrode 198.

The first sub-pixel electrodes 191Ra, 191Ga, and 191Ba include a left-inclined electrode piece 197 and a right-inclined electrode piece 196, and it has substantially the same structure as the base electrode 198 illustrated in FIG. 4C.

The second sub-pixel electrodes 191Rb and 191Bb, as shown in FIG. 10, include first and second unit electrodes 191Rb1 and 191Rb2, and 191Bb1 and 191Bb2, each having substantially the same structure as the base electrode 198, and the first and second unit electrodes 191Rb1 and 191Rb2, and 191Bb1 and 191Bb2, are connected vertically to each other via connectors 192R and 192B that pass over the first gate line 121a. In other words, the first unit electrodes 191Rb1 and 191Bb1 are disposed above the first gate line 121a, and the second unit electrodes 191Rb2 and 191Bb2 are disposed below the first gate line 121a. The convex vertex and concave vertex of the first unit electrodes 191Rb1 and 191Bb1 may be aligned along the first storage electrode line 131a, and the convex vertex and concave vertex of the second unit electrodes 191Rb2 and 191Bb2 may be aligned along the second storage electrode line 131b. The height of the first unit electrodes 191Rb1 and 191Bb1 is greater than the height of the second unit electrodes 191Rb2 and 191Bb2, preferably about 1.1 to 2 times higher. Also, when the height of the first subpixel electrodes 191Ra and 191Ba is equal to the height of the first unit electrodes 191Rb1 and 191Bb1, the area ratio of the first sub-pixel electrode 191Ra and 191Ba to the second sub-pixel electrode 191Rb and 191Bb becomes about 1:1.5 to 1:2. In this way, the desired area ratio can be obtained by regulating the width and the height of the first sub-pixel electrodes 191Ra and 191Ba and the first and the second unit electrodes 191Rb1, 191Rb2, 191Bb1, and 191Bb2 of the second sub-pixel electrodes 191Rb and 191Bb.

The first and second sub-pixel electrodes 191Ga and 191Gb are shown alone in FIG. 9 for clarity, and with the other first and second sub-pixel electrodes 191Ra, 191Ba, 191Rb, and 191Bb in FIG. 10. The second sub-pixel electrode 191Gb comprises three unit electrodes having substantially the same structure as the base electrode 198 and connected to each other in a row direction at the top and the bottom thereof. Two cutouts 91 and 92 trisect the second sub-pixel electrode 191Gb, and each of the two cutouts 91 and 92 includes a curved portion parallel to the curved edges of the second sub-pixel electrode 191Gb and a transverse portion connected thereto extending along the second storage electrode line 131b. The width of the second sub-pixel electrode 191Gb is wider, for example about three times wider, than that of the first sub-pixel electrode 191Ga. Also, the height of the second sub-pixel electrode 191Gb is preferably about ½ times to 1 times the height of the first sub-pixel electrode 191Ga. Similarly, the width and the height of the first and second sub-pixel electrodes 191Ga and 191Gb may be regulated to adjust the area ratio.

The width and the height of the sub-pixel electrodes 191Ra, 191Rb, 191Ga, 191Gb, 191Ba, and 191Bb may be regulated so that the areas of the pixel electrodes 191R, 191G, and 191B may be substantially the same.

In this way, assuming the pixel electrodes 191R, 191G, and 191B representing three different colors form a set of pixel electrodes, the shape of the pixel electrodes 191R, 191G, and 191B representing the same color in adjacent sets of pixel electrodes is repeated in the same manner, and the shape of the adjacent sets of pixel electrodes themselves is also repeated in the same manner. Consequently, expression of vertical lines is further improved, and it is advantageous to apply data voltages separately to the first and second sub-pixel electrodes 191Ra and 191Rb, 191Ga and 191Gb, and 191Ba and 191Bb.

Moreover, since it is easy to regulate the width and the height of the sub-pixel electrodes 191Ra, 191Rb, 191Ga, 191Gb, 191Ba, and 191Bb in a set of pixel electrodes, it also becomes easy to regulate the areas of the respective pixel electrodes 191R, 191G, and 191B in relation to each other.

As shown in FIG. 10, each data line 171 extends straightly in the second direction, and the intervals between data lines 171 are different, respectively. Each data line 171 overlaps all of the first and second sub-pixel electrodes 191a and 191b of each of two adjacent pixel electrodes 191.

For example, the first sub-pixel electrode 191Ba of the pixel electrode 191B facing a blue color filter is overlapped by two adjacent data lines 171. If the overlapping portion of the data line 171 connected to the pixel electrode 191B through a TFT and the pixel electrode 191B is referred to as a first region 171e, and if the overlapping portion of the adjacent data line 171 and the pixel electrode 191B is referred to as a second region 171f, the length of the first region 171e is longer than the length of the second region 171f. On the other hand, the width of the second region 171f is wider than that of the first region 171e. Consequently, the area of the first region 171e is substantially equal to the area of the second region 171f. Therefore, a change of a pixel electrode voltage due to a parasitic capacitance between a data line 171 and a pixel electrode 191 can be minimized.

Numerous characteristics of the LC panel assembly illustrated in FIG. 6 to FIG. 8 may be also applied to the LC panel assembly illustrated in FIG. 9 and FIG. 10.

Next, an LC panel assembly according to another exemplary embodiment of the present invention will be described with reference to FIG. 11, FIG. 12, and FIG. 13 along with FIG. 1 and FIG. 2 described above.

Figure 11:
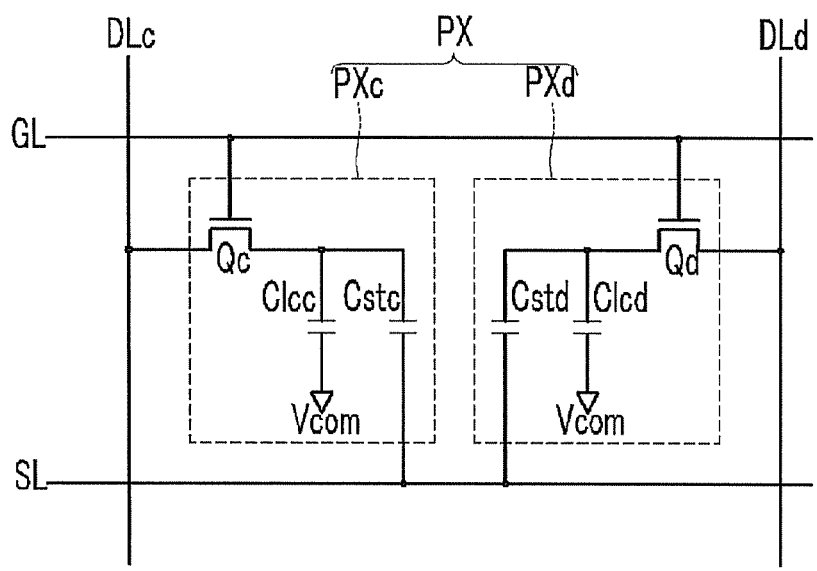
FIG. 11 is an equivalent circuit diagram of an exemplary pixel of an exemplary LC panel assembly according to another exemplary embodiment of the present invention.

FIG. 11 is an equivalent circuit diagram of an exemplary pixel of an exemplary LC panel assembly according to another exemplary embodiment of the present invention.

Referring to FIG. 11, an LCD panel assembly includes signal lines including a plurality of gate lines GL, a plurality of pairs of data lines DLc and DLd, and a plurality of storage electrode lines SL, and a plurality of pixels PX connected to the signal lines.

Each pixel PX includes a pair of sub-pixels PXc and PXd, and each sub-pixel PXc/PXd includes a switching element Qc/Qd that is respectively connected to the corresponding gate line GL and a data line DLc/DLd, an LC capacitor Clcc/Clcd that is connected to the switching element Qc/Qd, and a storage capacitor Cstc/Cstd that is connected to the switching element Qc/Qd and the storage electrode line SL.

Each switching element Qc/Qd including a TFT is a three-terminal element provided on the lower panel 100, and it has a control terminal, such as a gate electrode, connected to a gate line GL, an input terminal, such as a source electrode, connected to a data line DLc/DLd, and an output terminal, such as a drain electrode, connected to an LC capacitor Clcc/Clcd and a storage capacitor Cstc/Cstd.

The LC capacitors Clcc and Clcd, the storage capacitors Cstc and Cstd, and the operation of an LCD including the above LC panel assembly are substantially the same as the previous exemplary embodiment, so detailed descriptions thereof will be omitted. However, in the LCD illustrated in FIG. 5, the two sub-pixels PXa and PXb forming a pixel PX are applied with data voltages at different times, but in exemplary embodiment illustrated in FIG. 11, the two sub-pixels PXc and PXd are applied with data voltages at the same time.

Now, an example of the LC panel assembly illustrated in FIG. 11 will be described with reference to FIG. 12 and FIG. 13.

Figure 12:
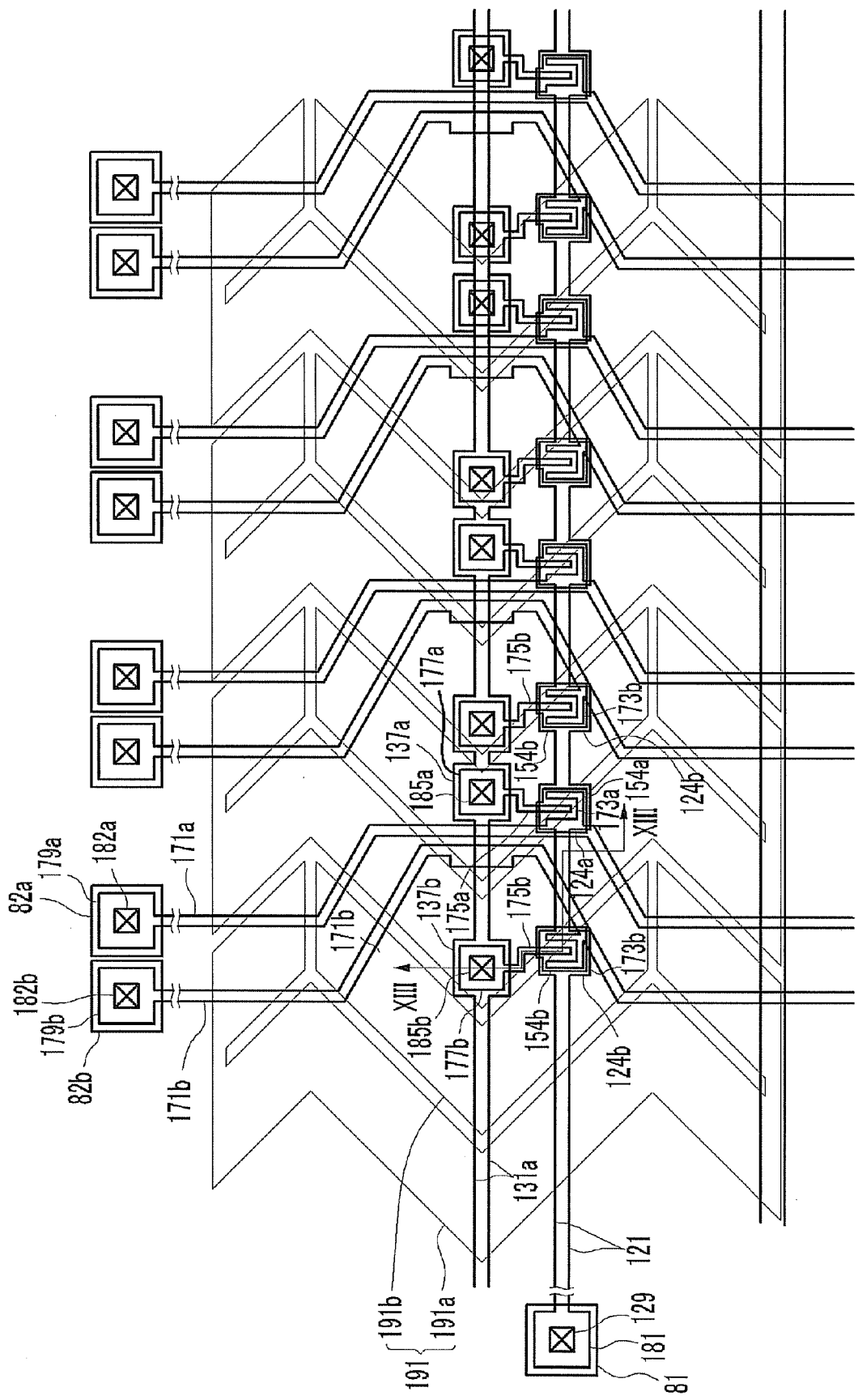
FIG. 12 is a layout view of an exemplary LC panel assembly according to another exemplary embodiment of the present invention.
Figure 13:
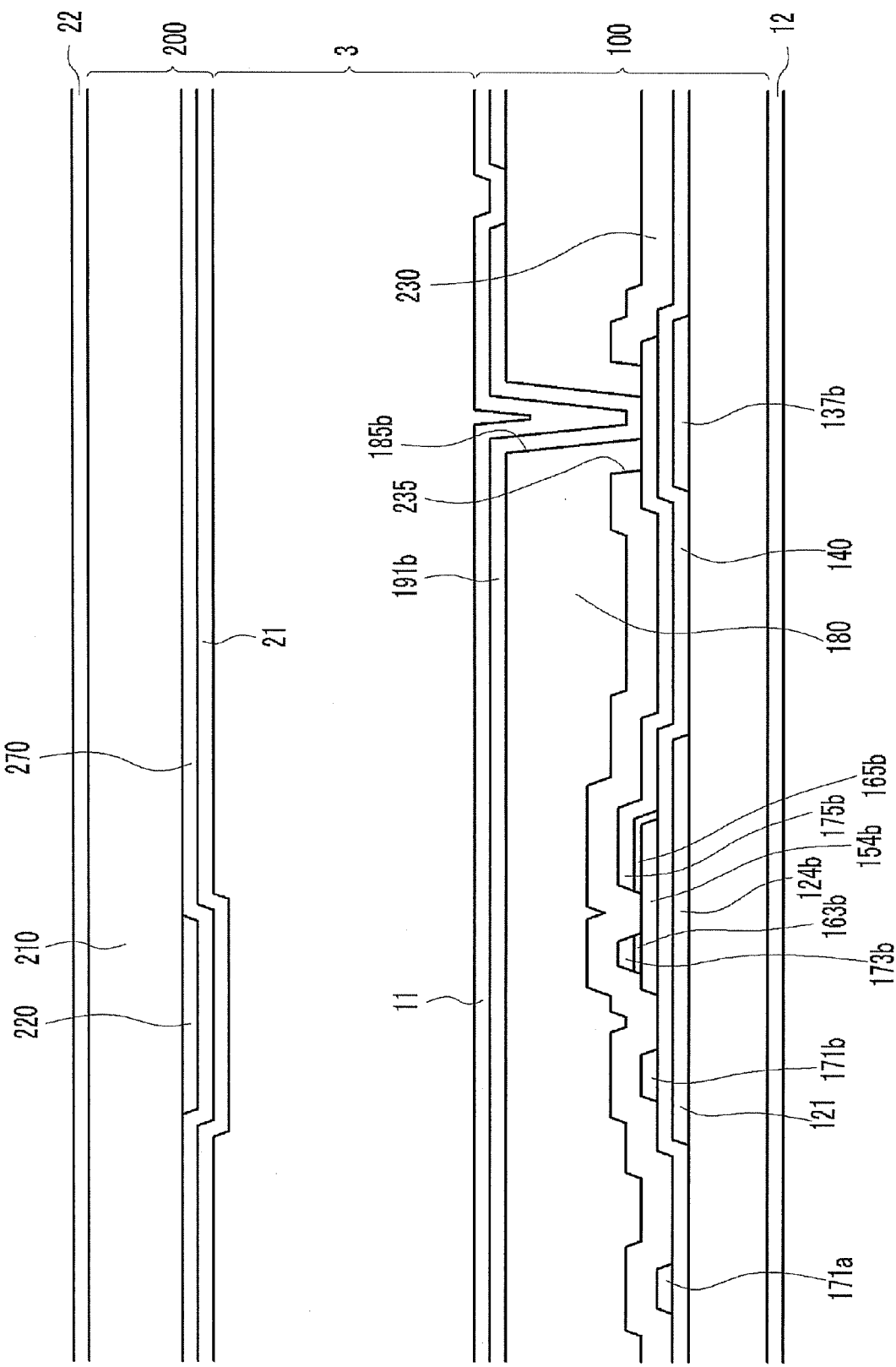
FIG. 13 is a cross-sectional view of the exemplary LC panel assembly illustrated in FIG. 12 taken along line XIII-XIII.

FIG. 12 is a layout view of an exemplary LC panel assembly according to another exemplary embodiment of the present invention, and FIG. 13 is a cross-sectional view of the exemplary LC panel assembly illustrated in FIG. 12 taken along line XIII-XIII.

Referring to FIG. 12 and FIG. 13, the LC panel assembly includes a lower panel 100 and an upper panel 200 opposing each other, and an LC layer 3 interposed between the two panels 100 and 200.

The layered structure of the LC panel assembly according to the exemplary embodiment illustrated in FIGS. 12 and 13 is substantially similar to the layered structure of the LC panel assembly illustrated in FIG. 6 to FIG. 8.

Regarding the lower panel 100, a plurality of gate conductors including a plurality of gate lines 121 and a plurality of storage electrode lines 131a are formed on an insulating substrate 110. Each storage electrode line 131a includes a plurality of storage electrodes 137a and 137b. Each gate line 121 includes first and second gate electrodes 124a and 124b and an end portion 129. A gate insulating layer 140 is formed on the gate conductors 121 and 131a and on the exposed portions of the insulating substrate. A plurality of semiconductor stripes including first and second projections 154a and 154b are formed on the gate insulating layer 140, and a plurality of ohmic contact islands 163b and 165b are formed thereon. Data conductors including a plurality of pairs of first and second data lines 171a and 171b and a plurality of first and second drain electrodes 175a and 175b are formed on the ohmic contacts 163b and 165b. The first and second data lines 171a and 171b include a plurality of first and second source electrodes 173a and 173b and end portions 179a and 179b, respectively, and the first and second drain electrodes 175a and 175b include expansions 177a and 177b overlapping the storage electrodes 137a and 137b. A passivation layer 180 is formed on the data conductors 171a, 171b, 175a, and 175b and the exposed portions of the semiconductors 154a and 154b, as well as on the exposed portions of the gate insulating layer 140, and the passivation layer 180 and the gate insulating layer 140 have a plurality of contact holes 181, 182a, 182b, 185a, and 185b. A plurality of pixel electrodes 191 including first and second sub-pixel electrodes 191a and 191b and a plurality of contact assistants 81, 82a, and 82b are formed on the passivation layer 180. An alignment layer 11 is formed on the pixel electrodes 191, the contact assistants 81, 82a, and 82b, and the passivation layer 180.

Regarding the upper panel 200, a light blocking member 220, a common electrode 270, and an alignment layer 21 are formed on an insulating substrate 210.

In the LC panel assembly of FIGS. 12 and 13, the number of gate lines 121 is half and the number of data lines 171a and 171b is twice as compared to the LC panel assembly illustrated in FIG. 6 and FIG. 9. That is, one pair of data lines 171a and 171b are disposed repeatedly in the same manner.

In addition, the first and second TFTs Qc and Qd connected to the first and second sub-pixel electrodes 191a and 191b forming a pixel electrode 191 are connected to the same gate line 121 and different data lines 171a and 171b from each other.

The first and second TFTs Qc and Qd are located on the right side and left side of the first and second data lines 171a and 171b, respectively, although alternate arrangements may be within the scope of these embodiments.

Also, in the LCD as illustrated in FIG. 13, a plurality of color filters 230 are formed under the passivation layer 180 of the lower panel 100 instead of providing color filters 230 on the upper panel 200.

The color filters 230 extend in the longitudinal direction along the pixel electrode 191 rows to form a stripe, and two color filters 230 overlap each other over a data line 171. The overlapped color filters 230 are made of an organic layer to insulate the pixel electrodes 191 from the data lines 171. Accordingly, even if the passivation layer 180 is not made of an organic material, generation of parasitic capacitances where the pixel electrodes 191 and the data lines 171 overlap each other is prevented. Also, the color filters 230 may function as light blocking members for blocking light leakage between pixel electrodes 191. In this case, the light blocking member 220 on the upper panel 200 may be omitted, which simplifies the manufacturing process of the LCD.

The color filters 230 have penetrating holes 235 through which contact holes 185a and 185b pass, and the penetrating hole 235 is larger than the contact holes 185a and 185b. The color filters 230 do not exist around the regions where the end portions 129 of the gate lines 121 and the end portions 179 of the data lines 171 are located.

A passivation layer (not shown) may also be provided under the color filters 230.

Numerous characteristics of the LC panel assembly illustrated in FIG. 6 to FIG. 8 may also be applied to the LC panel assembly illustrated in FIG. 12 and FIG. 13.

Now, another example of the LC panel assembly illustrated in FIG. 11 will be described with reference to FIG. 14.

Figure 14:
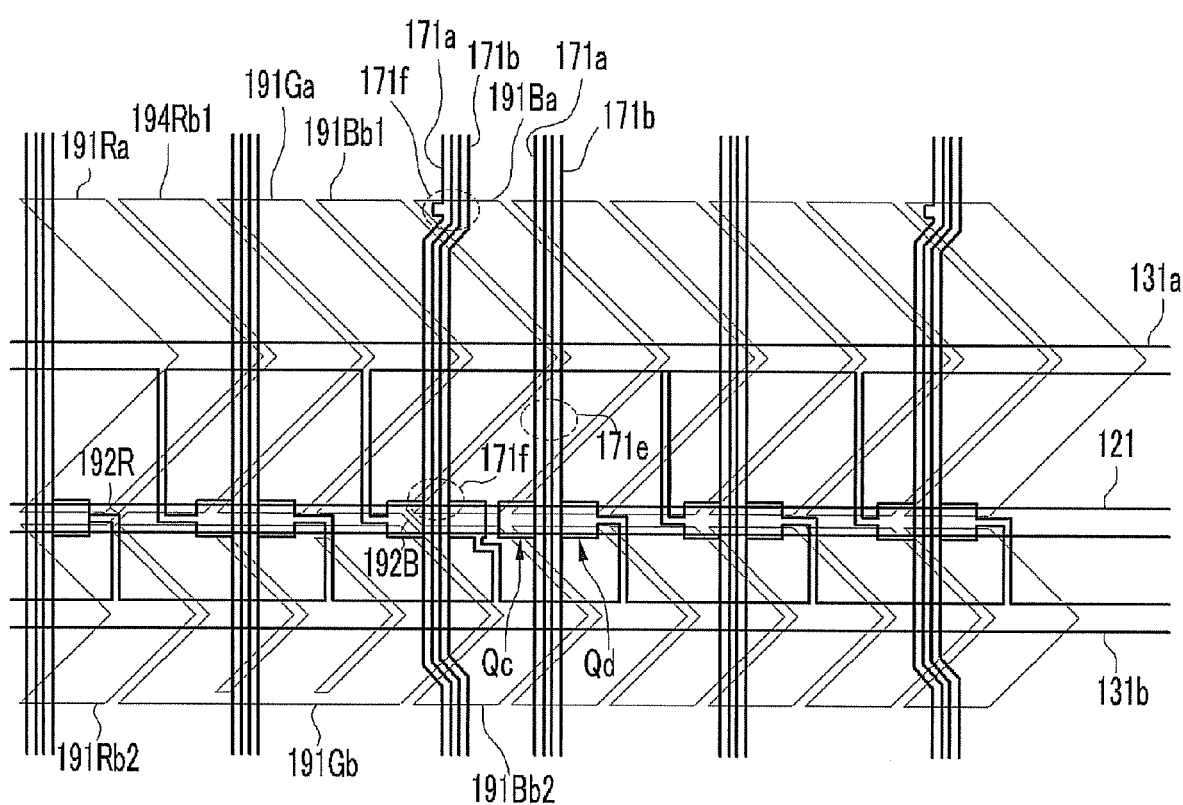
FIG. 14 is a layout view roughly illustrating an exemplary LC panel assembly according to another exemplary embodiment of the present invention.

FIG. 14 is a layout view roughly illustrating an exemplary LC panel assembly according to another exemplary embodiment of the present invention.

Referring to FIG. 14, the LC panel assembly includes a lower panel and an upper panel (not shown) opposing each other, and an LC layer (not shown) interposed between the two panels.

The layered structure of the LC panel assembly illustrated in FIG. 14 is substantially similar to the layered structure of the LC panel assembly illustrated in FIG. 6 to FIG. 8.

Regarding the lower panel, a plurality of gate conductors including a plurality of gate lines 121 and a plurality of storage electrode lines 131a and 131b are formed on an insulating substrate (not shown). Also, data lines 171a and 171b are formed to intersect the gate lines 121 and the storage electrode lines 131a and 131b. TFTs Qc and Qd are formed at the points where the gate lines 121 and the data lines 171a and 171b intersect each other. The TFTs Qc and Qd include first and second gate electrodes extended from each gate line 121, semiconductor islands, first and second source electrodes 173a and 173b extended from the data lines 171a and 171b, and first and second drain electrodes 175a and 175b. The shape of the TFTs Qc and Qd is substantially the same as that of the LC panel assembly illustrated in FIG. 12. Pixel electrodes 191 are formed on the TFTs Qc and Qd. The shape of the pixel electrodes 191 is substantially the same as that of the pixel electrodes of the LC panel assembly illustrated in FIG. 10.

Regarding the upper panel, a light blocking member, a plurality of color filters, an overcoat, a common electrode, and an alignment layer are formed on an insulating substrate.

However, unlike the LC panel assembly illustrated in FIG. 12 and FIG. 13, in the LC panel assembly illustrated in FIG. 14, most of the plurality of pairs of data lines 171a and 171b extend substantially in a straight line. Only the pair of data lines 171a and 171b connected to the pixel electrode 191G facing a green color filter and overlapping the pixel electrode 191B facing a blue color filter are curved or bent twice. Also, the width of the pair of data lines 171a and 171b is equal to that of the data lines 171 of the LC panel assembly illustrated in FIG. 10.

Numerous characteristics of the LC panel assembly illustrated in FIG. 6 to FIG. 8 may also be applied to the LC panel assembly illustrated in FIG. 14.

A method of minimizing or preventing vertical cross-talk in a display device is this made possible using the above described embodiments of the LCD. The method includes forming a first data line and an adjacent second data line on a substrate in a column direction of the display device, overlapping the first data line with first and second sub-pixel electrodes of a first pixel electrode, the first pixel electrode electrically connected to the first data line via a switching element, overlapping the first data line with at least one of a first and second sub-pixel electrode of a second pixel electrode, the second pixel electrode adjacent to the first pixel electrode in a row direction of the display device, the second pixel electrode also overlapping the second data line and electrically connected to the second data line via a switching element, and applying data voltages of opposite polarities to the first and second data lines, wherein changes of a pixel electrode voltage due to parasitic capacitances between the data lines and the pixel electrodes occur substantially simultaneously in positive-polarity and negative-polarity directions, and counteract each other.

In this way, according to the present invention, a parasitic capacitance generated between a data line and a pixel electrode is canceled out so that the effect of the parasitic capacitance on a change of a pixel electrode voltage is minimized. Thereby, occurrence of vertical cross-talk in a display device is prevented to improve the display quality.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a substrate including a plurality of pixels;
   a first gate line, and a second gate line adjacent to the first gate line in a column direction;
   a first pixel electrode on the substrate in one pixel, the first pixel electrode including a first sub-pixel electrode and a second sub-pixel electrode; and
   a plurality of data lines on the substrate,
   wherein
   a pair of adjacent data lines of the plurality of data lines overlaps the first pixel electrode, the pair of adjacent data lines having data voltages of opposite polarities,
   most of the first sub-pixel electrode and the second sub-pixel electrode are disposed between the first gate line and the second gate line,
   the first sub-pixel electrode comprises a first sub-pixel electrode part and the second sub-pixel electrode comprises a second sub-pixel electrode part, the first sub-pixel electrode part and the second sub-pixel electrode part being adjacent to and separated from each other in the column direction, and
   at least one portion of regions separating the first sub-pixel electrode part and the second sub-pixel electrode part overlaps with at least one of the first gate line and the second gate line.

2. The liquid crystal display of claim 1, further comprising a second pixel electrode in one pixel adjacent to the first pixel electrode in a row direction of the liquid crystal display,
   wherein the second pixel electrode comprises a third sub-pixel electrode and a fourth sub-pixel electrode, and
   wherein one data line of the pair of adjacent data lines is crossing
      at least one sub-pixel electrode of the first sub-pixel electrode and the second sub-pixel electrode, of the first pixel electrode, and
      at least one sub-pixel electrode of the third sub-pixel electrode and the fourth sub-pixel electrode, of the second pixel electrode, and
      the at least one sub-pixel electrode of the first pixel electrode being adjacent to the least one sub-pixel electrode of the second pixel electrode.

3. The liquid crystal display of claim 2, further comprising a storage electrode line crossing the at least one sub-pixel electrode of the first pixel electrode, and the at least one sub-pixel electrode of the second pixel electrode adjacent to each other.

4. The liquid crystal display of claim 2, wherein
   the at least one sub-pixel electrode of the first pixel electrode is the first sub-pixel electrode of the first pixel electrode, and
   the at least one sub-pixel electrode of the second pixel electrode is the fourth sub-pixel electrode of the second pixel electrode.

5. The liquid crystal display of claim 4, wherein an area of the first sub-pixel electrode of the first pixel electrode is different from an area of the second sub-pixel electrode of the first pixel electrode.

6. The liquid crystal display of claim 5, wherein the area of the second sub-pixel electrode of the first pixel electrode is larger than the area of the first sub-pixel electrode of the first pixel electrode.

7. The liquid crystal display of claim 2, further comprising:
   a first thin film transistor connected to the first sub-pixel electrode of the first pixel electrode; and
   a second thin film transistor connected to the second sub-pixel electrode of the first pixel electrode,
   wherein the first thin film transistor and the second thin film transistor are connected to the one data line of the pair of adjacent data lines.

8. The liquid crystal display of claim 7, further comprising:
   a third thin film transistor connected to the third sub-pixel electrode of the second pixel electrode; and
   a fourth thin film transistor connected to the fourth sub-pixel electrode of the second pixel electrode,
   wherein the third thin film transistor and the fourth thin film transistor are connected to the other data line of the pair of adjacent data lines.

9. The liquid crystal display of claim 8, wherein the gate lines comprise:
   the first gate line is connected to the first thin film transistor; and
   the second gate line is connected to the second thin film transistor.

10. The liquid crystal display of claim 9, further comprising:
    a third gate line connected to the third thin film transistor; and
    a fourth gate line connected to the fourth thin film transistor.

11. The liquid crystal display of claim 10, wherein the third gate line is the first gate line, and the fourth gate line is the second gate line.

12. The liquid crystal display of claim 2, wherein at least one of the pair of adjacent data lines turns at least four times in a portion in which the first pixel electrode and the second pixel electrode exist.

13. The liquid crystal display of claim 2, wherein the one data line of the pair of adjacent data lines comprises:
    a first portion overlapping the first pixel electrode; and
    a second portion overlapping the second pixel electrode,
    wherein an area of the first portion is substantially equal to an area of the second portion.

14. The liquid crystal display of claim 1, wherein a voltage of the first sub-pixel electrode of the first pixel electrode is different from a voltage of the second sub-pixel electrode of the first pixel electrode.

15. The liquid crystal display of one of claim 1, further comprising:
    a first thin film transistor connected to the first sub-pixel electrode of the first pixel electrode;
    a second thin film transistor connected to the second sub-pixel electrode of the first pixel electrode;

wherein the first thin film transistor is connected to one data line of the pair of adjacent data lines and one of the first gate line and the second gate line, and the second thin film transistor is connected to the other data line of adjacent data lines and the same one of the first gate line and the second gate line.

16. The liquid crystal display of claim 15, wherein the first and second thin film transistors are turned on in response to signals from the same one gate line and transmit signals from the pair of adjacent data lines, respectively.

17. The liquid crystal display of claim 16, further comprising an organic layer formed between the pair of adjacent data lines and the first pixel electrode

* * * * *